(12) United States Patent
Deogun et al.

(10) Patent No.: US 11,166,300 B2
(45) Date of Patent: Nov. 2, 2021

(54) METHOD AND NETWORK NODE FOR PERFORMING DATA TRANSMISSION AND MEASUREMENTS ON MULTIPLE BANDWIDTH PARTS

(71) Applicant: Samsung Electronics Co., Ltd, Suwon-si (KR)

(72) Inventors: Pravjyot Singh Deogun, Bangalore (IN); Arunkumar Nagarajan, Bangalore (IN); Aneesh Deshmukh, Bangalore (IN); Nayan Ostwal, Bangalore (IN); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/147,325

(22) Filed: Sep. 28, 2018

(65) Prior Publication Data

US 2019/0075585 A1    Mar. 7, 2019

(30) Foreign Application Priority Data

Sep. 28, 2017  (IN) .............................. 201741034572
Jan. 10, 2018  (IN) .............................. 201841001134
Sep. 4, 2018   (IN) .............................. 201741034572

(51) Int. Cl.
*H04W 72/12*    (2009.01)
*H04B 7/02*     (2018.01)
*H04W 72/04*    (2009.01)

(52) U.S. Cl.
CPC .......... *H04W 72/1273* (2013.01); *H04B 7/02* (2013.01); *H04W 72/042* (2013.01); *H04W 72/1257* (2013.01); *H04W 72/1268* (2013.01)

(58) Field of Classification Search
CPC ........... H04B 7/02; H04L 5/00; H04L 5/0005; H04L 5/0053; H04L 5/0092;
(Continued)

(56) References Cited

U.S. PATENT DOCUMENTS 8,731,477 B2   5/2014  Ekici
8,804,632 B2 * 8/2014  Lee .................... H04W 74/004
                                                       370/329

(Continued)

FOREIGN PATENT DOCUMENTS

EP      3092864 A1    11/2016
JP      2012-503950 A  2/2012
(Continued)

OTHER PUBLICATIONS

U.S. Appl. No. 62/439,434, filed 2016.*

(Continued)

*Primary Examiner* — Dung B Huynh

(57) ABSTRACT

The present disclosure relates to a pre-5th-generation (5G) or 5G communication system to be provided for supporting higher data rates beyond 4th-generation (4G) communication system such as long term evolution (LTE). A terminal in a wireless communication system is provided. The terminal includes a transceiver; and at least one processor configured to: receive, from a base station, configuration information for a bandwidth part, and receive, from the base station, information for a resource configuration within the bandwidth part.

14 Claims, 29 Drawing Sheets

(58) Field of Classification Search
CPC .......... H04W 72/042; H04W 72/1257; H04W 72/1268; H04W 72/1273; H04W 72/04–10
See application file for complete search history.

(56) References Cited

U.S. PATENT DOCUMENTS

| | | | |
|---|---|---|---|
| 9,237,522 B2 | 1/2016 | Golitschek Edler Von Elbwart et al. | |
| 10,321,489 B2 | 6/2019 | Kitazoe et al. | |
| 10,764,881 B2* | 9/2020 | Jiao | H04W 76/34 |
| 2010/0074209 A1 | 3/2010 | Montojo et al. | |
| 2010/0167665 A1* | 7/2010 | Zetterman | H04B 1/0003 455/78 |
| 2010/0246561 A1* | 9/2010 | Shin | H04W 52/32 370/345 |
| 2010/0260130 A1* | 10/2010 | Earnshaw | H04L 1/1822 370/329 |
| 2012/0020320 A1* | 1/2012 | Issakov | G01S 5/06 370/330 |
| 2012/0057547 A1* | 3/2012 | Lohr | H04L 5/0064 370/329 |
| 2012/0069805 A1* | 3/2012 | Feuersanger | H04W 72/0413 370/329 |
| 2012/0088458 A1* | 4/2012 | Nogami | H04B 7/0645 455/67.11 |
| 2012/0093096 A1* | 4/2012 | Barbieri | H04J 3/1694 370/329 |
| 2012/0263047 A1 | 10/2012 | Love et al. | |
| 2013/0016692 A1* | 1/2013 | Chen | H04L 5/0053 370/330 |
| 2013/0163533 A1* | 6/2013 | Anderson | H04W 72/04 370/329 |
| 2014/0036853 A1* | 2/2014 | Kim | H04L 5/0053 370/329 |
| 2014/0056278 A1* | 2/2014 | Marinier | H04W 72/1268 370/330 |
| 2014/0092829 A1* | 4/2014 | Han | H04L 5/0035 370/329 |
| 2014/0106774 A1* | 4/2014 | Siomina | H04W 64/00 455/456.1 |
| 2014/0133370 A1* | 5/2014 | Chen | H04W 72/042 370/280 |
| 2014/0177540 A1* | 6/2014 | Novak | H04W 72/0406 370/329 |
| 2014/0254452 A1* | 9/2014 | Golitschek Edler Von Elbwart | H04W 52/0219 370/311 |
| 2015/0043490 A1* | 2/2015 | Wu | H04W 74/0833 370/329 |
| 2015/0049678 A1* | 2/2015 | Speight | H04W 72/042 370/329 |
| 2015/0181576 A1* | 6/2015 | Papasakellariou | H04L 1/08 370/329 |
| 2015/0215097 A1* | 7/2015 | Yi | H04L 1/1829 370/329 |
| 2015/0245326 A1* | 8/2015 | Rune | H04L 5/006 370/329 |
| 2015/0282124 A1* | 10/2015 | Miao | H04W 72/042 455/450 |
| 2015/0326371 A1* | 11/2015 | Baek | H04L 5/00 455/450 |
| 2015/0327104 A1 | 11/2015 | Yiu et al. | |
| 2015/0327322 A1* | 11/2015 | Huang | H04W 24/10 370/329 |
| 2016/0050557 A1* | 2/2016 | Park | H04W 12/04 455/419 |
| 2016/0142898 A1* | 5/2016 | Poitau | H04W 8/005 370/329 |
| 2016/0192433 A1* | 6/2016 | Deenoo | H04W 76/28 370/329 |
| 2017/0048108 A1 | 2/2017 | Yi et al. | |
| 2017/0086108 A1 | 3/2017 | Meshkati et al. | |
| 2017/0118701 A1* | 4/2017 | Kim | H04W 48/20 |
| 2017/0118725 A1* | 4/2017 | Chu | H04W 52/367 |
| 2017/0134139 A1* | 5/2017 | Cho | H04W 72/0446 |
| 2017/0149543 A1* | 5/2017 | Ang | H04L 5/0053 |
| 2017/0285177 A1* | 10/2017 | Jin | G01S 5/0063 |
| 2017/0303302 A1* | 10/2017 | Bagheri | H04W 72/1284 |
| 2017/0367046 A1* | 12/2017 | Papasakellariou | H04L 5/0048 |
| 2018/0019843 A1* | 1/2018 | Papasakellariou | H04W 72/1278 |
| 2018/0048435 A1* | 2/2018 | Islam | H04W 72/005 |
| 2018/0049073 A1* | 2/2018 | Dinan | H04W 4/70 |
| 2018/0049169 A1* | 2/2018 | Lin | H04W 72/042 |
| 2018/0063865 A1* | 3/2018 | Islam | H04L 5/0091 |
| 2018/0070369 A1* | 3/2018 | Papasakellariou | H04W 56/00 |
| 2018/0098361 A1* | 4/2018 | Ji | H04L 5/0092 |
| 2018/0123765 A1* | 5/2018 | Cao | H04L 1/1614 |
| 2018/0124753 A1* | 5/2018 | Sun | H04L 1/0079 |
| 2018/0139778 A1* | 5/2018 | Chou | H04W 76/27 |
| 2018/0176937 A1* | 6/2018 | Chen | H04W 72/1257 |
| 2018/0183551 A1* | 6/2018 | Chou | H04L 5/0042 |
| 2018/0199359 A1* | 7/2018 | Cao | H04L 5/0094 |
| 2018/0212739 A1* | 7/2018 | Kim | H04B 7/0632 |
| 2018/0270812 A1* | 9/2018 | Lee | H04W 72/042 |
| 2018/0279218 A1* | 9/2018 | Park | H04W 36/0069 |
| 2018/0279289 A1* | 9/2018 | Islam | H04L 5/0094 |
| 2018/0279353 A1* | 9/2018 | Shaheen | H04W 72/1284 |
| 2018/0288746 A1* | 10/2018 | Zhang | H04L 1/0031 |
| 2018/0295651 A1* | 10/2018 | Cao | H04W 72/042 |
| 2018/0310300 A1* | 10/2018 | Lin | H04W 72/0413 |
| 2018/0317213 A1* | 11/2018 | Islam | H04L 1/1822 |
| 2018/0323928 A1* | 11/2018 | Yang | H04L 5/0051 |
| 2018/0332606 A1* | 11/2018 | Lee | H04W 72/042 |
| 2018/0359064 A1* | 12/2018 | Kim | H04W 56/0005 |
| 2018/0367386 A1* | 12/2018 | Liao | H04W 48/00 |
| 2018/0368156 A1* | 12/2018 | Agiwal | H04W 72/1242 |
| 2019/0020381 A1* | 1/2019 | Tooher | H04W 72/0406 |
| 2019/0021085 A1* | 1/2019 | Mochizuki | H04W 72/04 |
| 2019/0036673 A1* | 1/2019 | Chen | H04L 5/0098 |
| 2019/0037586 A1* | 1/2019 | Park | H04L 1/0057 |
| 2019/0045549 A1* | 2/2019 | Wu | H04W 72/085 |
| 2019/0053029 A1* | 2/2019 | Agiwal | H04W 76/28 |
| 2019/0053170 A1* | 2/2019 | Lee | H04W 76/27 |
| 2019/0053211 A1* | 2/2019 | Ying | H04W 72/044 |
| 2019/0053287 A1* | 2/2019 | Lin | H04J 13/14 |
| 2019/0059112 A1* | 2/2019 | Ou | H04W 74/008 |
| 2019/0090266 A1* | 3/2019 | Zhao | H04W 72/1205 |
| 2019/0098605 A1* | 3/2019 | Seo | H04L 1/1812 |
| 2019/0098655 A1* | 3/2019 | Shih | H04B 7/0617 |
| 2019/0116592 A1* | 4/2019 | Moon | H04L 5/0044 |
| 2019/0199503 A1* | 6/2019 | Son | H04L 5/0053 |
| 2019/0223097 A1* | 7/2019 | Yi | H04W 52/0216 |
| 2019/0230578 A1* | 7/2019 | Karaki | H04W 74/0816 |
| 2019/0230685 A1* | 7/2019 | Park | H04W 72/12 |
| 2019/0245648 A1* | 8/2019 | Jo | H04W 72/04 |
| 2019/0260530 A1* | 8/2019 | Yi | H04L 5/0044 |
| 2019/0342782 A1* | 11/2019 | Yum | H04L 5/0091 |
| 2019/0356524 A1* | 11/2019 | Yi | H04L 5/0094 |
| 2019/0373667 A1* | 12/2019 | Jeon | H04L 5/0044 |
| 2019/0393992 A1* | 12/2019 | Xiong | H04L 1/1861 |
| 2020/0008228 A1* | 1/2020 | Lee | H04W 72/1284 |
| 2020/0052939 A1* | 2/2020 | Xiong | H04L 5/0048 |
| 2020/0059345 A1* | 2/2020 | Pelletier | H04L 1/1657 |
| 2020/0067676 A1* | 2/2020 | Yi | H04L 5/0091 |
| 2020/0077432 A1* | 3/2020 | Xiong | H04L 1/1825 |
| 2020/0136878 A1* | 4/2020 | Yi | H04W 24/10 |
| 2020/0146032 A1* | 5/2020 | Bae | H04W 72/14 |
| 2020/0163061 A1* | 5/2020 | Tang | H04W 72/042 |
| 2020/0163122 A1* | 5/2020 | Lee | H04W 80/02 |
| 2020/0196327 A1* | 6/2020 | Zhang | H04W 72/1242 |
| 2020/0245395 A1* | 7/2020 | Zhang | H04L 5/0053 |
| 2020/0252180 A1* | 8/2020 | Takeda | H04W 72/04 |
| 2020/0274750 A1* | 8/2020 | Yi | H04L 27/2613 |
| 2020/0305167 A1* | 9/2020 | Freda | H04L 1/1642 |

(56) References Cited

U.S. PATENT DOCUMENTS

2020/0374748 A1* 11/2020 Ahn ............... H04W 72/042
2021/0014791 A1* 1/2021 Freda ............ H04W 52/0216

FOREIGN PATENT DOCUMENTS

TW         201012258 A    3/2010
WO       2015/105353 A1    7/2015

OTHER PUBLICATIONS

U.S. Appl. No. 62/476,309, filed 2017.*
U.S. Appl. No. 62/547,373, filed 2017.*
ISR/KR, "International Search Report and Written Opinion of the International Searching Authority," International Application No. PCT/KR2018/011406, dated Jan. 8, 2019, 11 pages.
CMCC, "Discussion on scheduling for SPS," R1-1716059, 3GPP TSG RAN WG1 Meeting NR#3, Nagoya, Japan, Sep. 18-21, 2017, 4 pages.
Guangdong OPPO Mobile Telecom, "Remaining issues on bandwidth part configuration and activation," R1-1715692, 3GPP TSG RAN WG1 Meeting NR#3, Nagoya, Japan, Sep. 18-21, 2017, 4 pages.
Mediatek Inc., "Summary of Offline Discussion on Bandwidth Part Operation," R1-1716832, 3GPP TSG RAN WG1 Meeting NR#3, Nagoya, Japan, Sep. 18-21, 2017, 7 pages.
Vivo, "Remaining details for bandwidth part operation," R1-1715648, 3GPP TSG RAN WG1 NR AH#3, Nagoya, Japan, Sep. 18-21, 2017, 3 pages.
Examination Report in connection with Indian Patent Application No. 201741034572 dated Jun. 26, 2020, 6 pages.
Guangdong OPPO Mobile Telecom, "Remaining issues on bandwidth part configuration and activation", 3GPP TSG RAN WG1 Meeting #90, Aug. 21-25, 2017, R1-1713266, 6 pages.
InterDigital, Inc., "Remaining details of BWP", 3GPP TSG RAN WG1 Meeting AH_NR#3, Sep. 18-21, 2017, R1-1716258, 6 pages.
Supplementary Partial European Search Report dated Oct. 27, 2020 in connection with European Patent Application No. 18 86 0619, 10 pages.
European Patent Office, "Supplementary European Search Report" dated Mar. 4, 2021, in connection with European Patent Application No. 18860619.8, 12 pages.

* cited by examiner

SPS Configuration

- SPS C-RNTI
- SPS Periodicity
- SPS Offset
- Time Domain Resources: List of objects, where each object contains:
  - Parameters value
  - List of bandwidth part Ids
- Frequency Domain Resources: List of objects, where each object contains:
  - Parameters value
  - List of bandwidth part Ids
- DM-RS Resources: List of objects, where each object contains:
  - Parameters value
  - List of bandwidth part Ids

FIG.13B

SR Configuration

- SR configuration identity
- dsr-TransMax
- sr-ProhibitTimer
- Logical Channel to SR Mapping
- PUCCH Resources: List of objects, where each object contains:
  - PUCCH parameters
  - List of bandwidth part Ids
- sr-ConfigIndex: List of objects, where each object contains:
  - Parameters value
  - List of bandwidth part Ids

FIG.16B

PUCCH Configuration

- PUCCH Configuration identity
- PUCCH Resource allocation: List of objects, where each object contains:
  - PUCCH parameters e.g. PUCCH periodicity, repetition configuration, RB allocation, etc
  - List of bandwidth part Ids

FIG.17B

METHOD AND NETWORK NODE FOR PERFORMING DATA TRANSMISSION AND MEASUREMENTS ON MULTIPLE BANDWIDTH PARTS

CROSS-REFERENCE TO RELATED APPLICATIONS

This application is based on and claims priority under 35 U.S.C. § 119 to Indian Patent Application No. 201741034572 filed on Sep. 28, 2017; Indian Patent Application No. 201841001134 filed on Jan. 10, 2018; and Indian Patent Application No. 201741034572 filed on Sep. 4, 2018 in the India Patent Office, the disclosures of which are incorporated herein by reference in their entireties.

BACKGROUND

1. Field

The present disclosure relates to a method and apparatus for performing data transmission and measurements on multiple bandwidth parts.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" or a "post long term evolution (LTE) System."

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The above information is presented as background information only to help the reader to understand the present disclosure. Applicants have made no determination and make no assertion as to whether any of the above might be applicable as prior art with regard to the present application.

SUMMARY

The principal object of the embodiments herein is to provide a method and apparatus for performing data transmission and measurements on multiple bandwidth parts.

Another object of the embodiments herein is to provide a mechanism for a user equipment (UE) to receive downlink data without performing connection establishment with the cellular network.

Another object of the embodiments herein is to dynamically configure a semi-persistent scheduling (SPS) resources for each bandwidth part configured to the UE.

Another object of the embodiments herein is to dynamically provide a scheduling request (SR) configuration for each of the bandwidth part configured to the UE.

Another object of the embodiments herein is to provide an optimal measurement gap to the UE by a master node (MN) by coordinating with a secondary node (SN).

Accordingly the embodiments herein provide a method for configuring semi-persistent scheduling (SPS) resources to a user equipment (UE) in a wireless communication system. The method includes determining one or more bandwidth parts configured to the UE and configuring the SPS resources for the one or more bandwidth parts configured to the UE.

Accordingly the embodiments herein provide a method for providing scheduling request (SR) configuration to a UE in a wireless communication system. The method includes determining the one or more bandwidth parts configured to the UE and configuring the Scheduling Request configuration for the one or more bandwidth parts configured to the UE.

Accordingly the embodiments herein provide a measurement gap to a UE in a wireless communication network. The method includes receiving measurement gap capability information from the UE and transmitting measurement gap assistance information to a secondary node (SN). Further, the method also includes receiving the measurement gap assistance information from the SN and indicating the one or more measurement gaps to the UE based on a first list of frequencies configured by the MN, a second list of frequencies configured by the SN and the measurement gap assistance information received from the SN.

Accordingly the embodiments herein provide a method for providing the measurement gap to the UE in the wireless communication network. The method includes configuring a list of frequencies for measurements to the UE and receiving measurement gap assistance information from the UE. Further, the method also includes indicating the one or more measurement gaps based on the received measurement gap assistance information.

Accordingly the embodiments herein provide a network node configuring semi-persistent scheduling (SPS) resources for one or more bandwidth parts to a User Equipment (UE) in a wireless communication system. The network node includes a memory, a processor, a bandwidth part determination engine and a SPS resources configuration engine. The bandwidth part determination engine is configured to determine the one or more bandwidth parts configured to the UE. The SPS resources configuration engine is configured to configure the SPS resources for the one or more bandwidth parts configured to the UE.

Accordingly the embodiments herein provide a network node for providing scheduling request (SR) configuration for one or more bandwidth parts to a user equipment (UE) in a wireless communication system. The network node includes a memory, a processor, a bandwidth part determination engine and a SR resources configuration engine. The bandwidth part determination engine is configured to determine the one or more bandwidth parts configured to the UE. The SR resources configuration engine is configured to configure the SPS resources for the one or more bandwidth parts configured to the UE.

Accordingly the embodiments herein provide a network node for providing a measurement gap configuration for one or more bandwidth parts to a user equipment (UE) in a wireless communication network. The network node includes a memory, a processor, a measurement gap management engine and a communicator. The communicator is configured to receive measurement gap capability information from the UE and transmit measurement gap assistance information to a secondary node (SN). Further, the communicator is also configured to receive the measurement gap assistance information from the SN and indicate the one or more measurement gaps to the UE based on a first list of frequencies configured by the MN, a second list of frequencies configured by the SN and the measurement gap assistance information received from the SN.

Accordingly the embodiments herein provide a network node for providing a measurement gap configuration for one or more bandwidth parts to a user equipment (UE) in a wireless communication network. The network node includes a memory, a processor, a measurement gap management engine and a communicator. The measurement gap management engine is configured to configure a list of frequencies for measurements to the UE. The communicator is configured to receive measurement gap assistance information from the UE and indicate one or more measurement gaps based on the received measurement gap assistance information.

In one embodiment, a terminal in a wireless communication is provided. The terminal includes a transceiver; and at least one processor configured to: receive, from a base station, configuration information for a bandwidth part, and receive, from the base station, information for a resource configuration within the bandwidth part.

In yet another embodiment, a master node in a wireless communication is provided. The master includes a transceiver; and at least one processor configured to: receive, from a secondary node, a first message that is used by the secondary node to indicate a first list of frequencies measured by a terminal, and transmit, to the secondary node, a second message that is used by the master node to indicate a second list of frequencies measured by the terminal.

In yet another embodiment, a base station in a wireless communication is provided. The base station includes a transceiver; and at least one processor configured to: transmit, to a terminal, configuration information for a bandwidth part, and transmit, to the terminal, information for a resource configuration within the bandwidth part.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 13B illustrates a graph of a second example of the cellular network configuration of the SPS resources for different bandwidth parts where the configuration is divided into the common and the bandwidth part specific parameter containers according to the embodiment as disclosed herein;

FIG. 16B illustrates a graph of the second example of the cellular network configuration of scheduling request resources for different bandwidth parts where configuration is divided into the common and the bandwidth part specific parameter containers according to the embodiment as disclosed herein;

FIG. 17B illustrates a graph of the second example of the cellular network configuration of the physical uplink control channel (PUCCH) resources for different bandwidth parts where configuration is divided into the common and the bandwidth part specific parameter containers according to the embodiment as disclosed herein;

DETAILED DESCRIPTION

Figure 1:
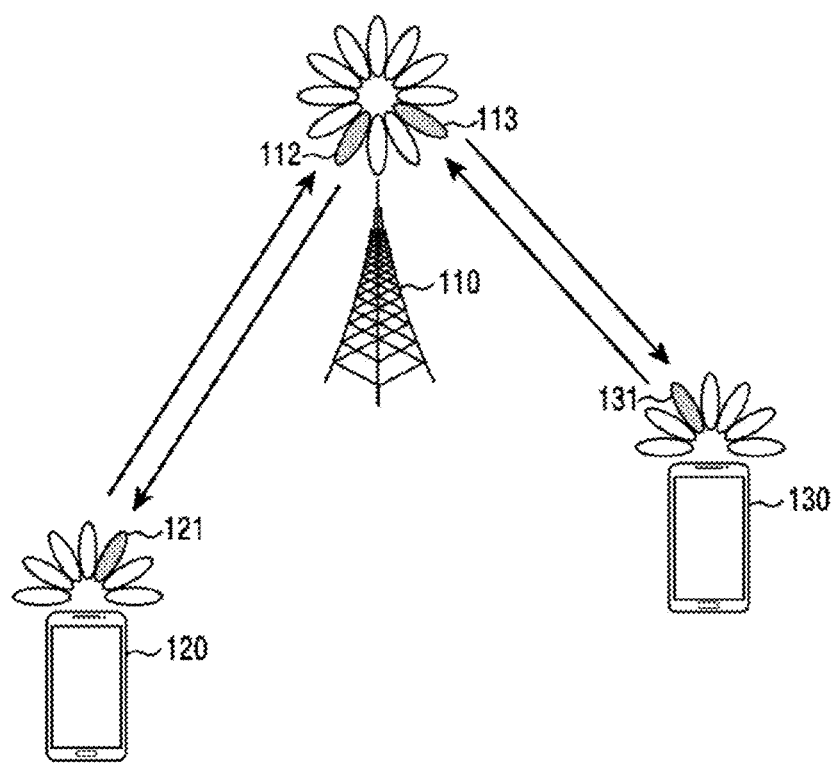
FIG. 1 illustrates a wireless communication system according to various embodiments of the present disclosure.

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Hereinafter, the present disclosure describes technology for method and network node for performing data transmission and measurements on multiple bandwidth parts in a wireless communication system.

The terms referring to bandwidth parts, the terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd generation partnership project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, Doppler spread, Doppler shift, average gain, average delay, and spatial Rx parameters.

Figure 2:
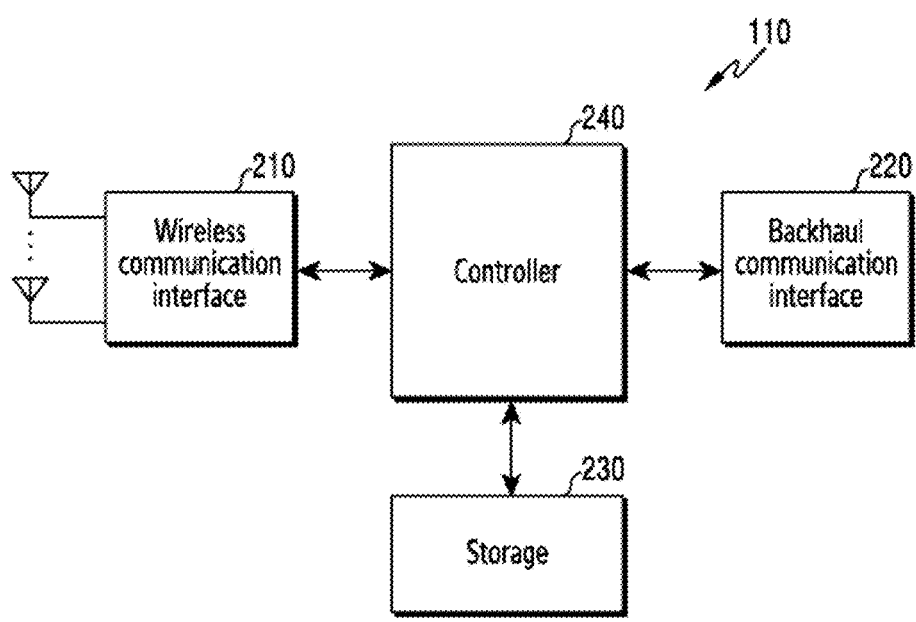
FIG. 2 illustrates the BS in the wireless communication system according to various embodiments of the present disclosure.

FIG. 2 illustrates the BS in the wireless communication system according to various embodiments of the present disclosure. A structure exemplified at FIG. 2 may be understood as a structure of the BS 110. The term "-module," "-unit," or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into a radio frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like.

The digital unit may be implemented as at least one processor (e.g., a digital signal processor (DSP)).

The wireless communication interface 210 transmits and receives the signal as described above. Accordingly, the wireless communication interface 210 may be referred to as a "wireless communication unit," a "wireless communication module," a "transmitter," a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams. The backhaul communication interface 220 may be referred to as a "backhaul communication unit" or a "backhaul communication module."

The storage unit 230 stores a basic program, an application, and data such as setting information for the operation of the BS. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

According to exemplary embodiments of the present disclosure, the controller 240 may determine one or more bandwidth parts configured to UE and configure SPS resources for one or more bandwidth part configured to UE. For example, the controller 240 may control the base station to perform operations according to the exemplary embodiments of the present disclosure.

Figure 3:
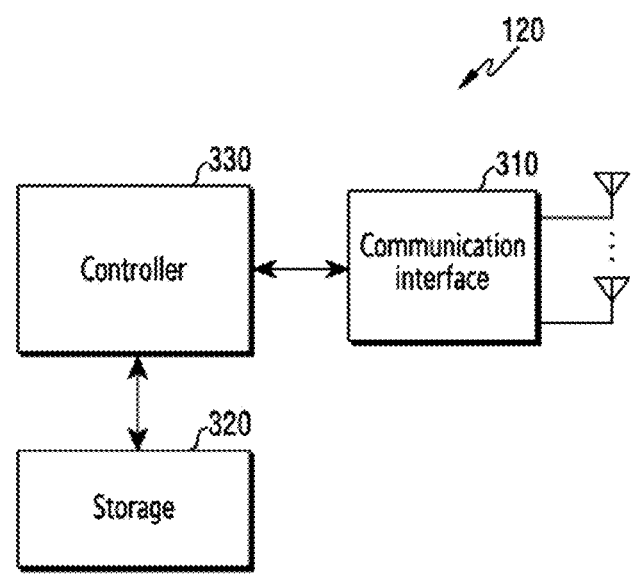
FIG. 3 illustrates the terminal in the wireless communication system according to various embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module," "-unit," or "-er" used hereinafter may refer to the unit for processing at least one function or operation, and may be implemented in hardware, software, or a combination of hardware and software.

Referring to FIG. 3, the terminal includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "communication unit," a "communication module," a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to exemplary embodiments of the present disclosure, the controller 330 may control the terminal to perform operations according to the exemplary embodiments of the present disclosure.

Figure 4:
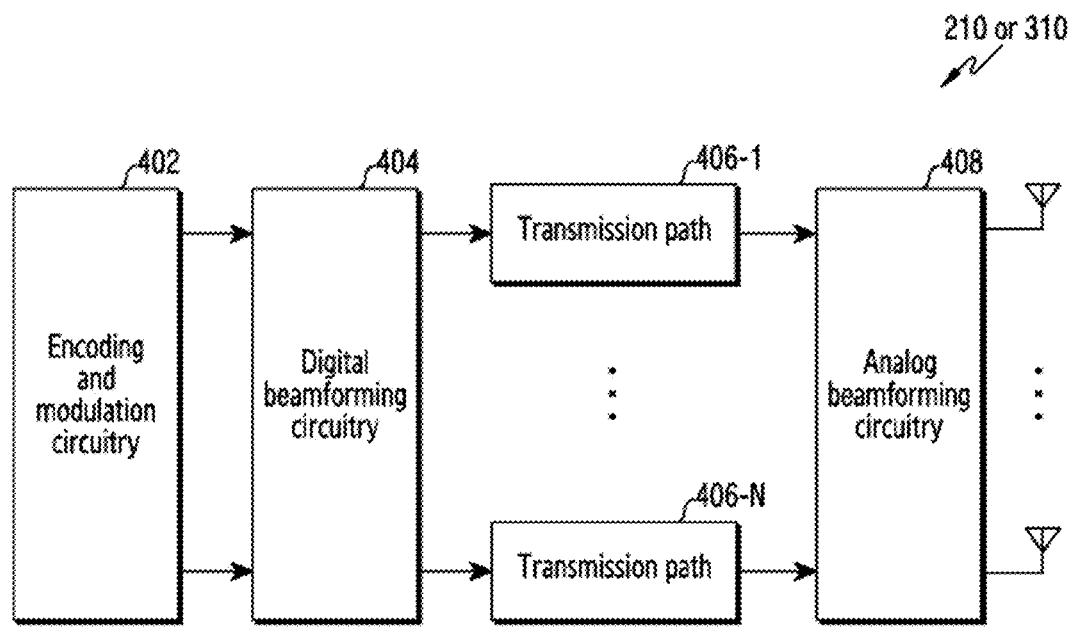
FIG. 4 illustrates the communication interface in the wireless communication system according to various embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

In general, to support multiple physical layer configurations and diverse application requirements in 5G technology, a cellular network needs to support bandwidth of an order of 1 GHz in a single frequency carrier. Further, the cellular network is expected to support the bandwidth of the order of 1 GHz without carrier aggregation. However, the cellular network faces various challenges such as a user equipment (UE) must support wide bandwidth such as radio frequency (RF), power consumption, scheduling etc. Therefore, a bandwidth part operation was provided for the 5G which allows the UE to support a narrow bandwidth to be able to connect to a 5G cell with the wide bandwidth. Further, based on the bandwidth part operation, the bandwidth of the 5G cell is sub-divided in to multiple bandwidth parts and the UE performs transmission/reception on one of the bandwidth parts configured by the cellular network. Further, the cellular network can perform a bandwidth part switching/adaptation for the UE which allows saving power efficiently and also provides load balancing for the cellular network. However, the bandwidth part switching leads to scheduling and measurement issues such as for example, providing a semi-persistent scheduling (SPS) configuration and a scheduling request (SR) configuration for each bandwidth part to the UE, requirement of measurement gaps for measuring the multiple bandwidth parts and splitting bearer operation where packet data convergence protocol (PDCP) entity is connected to radio link control (RLC) entities which serve different bandwidth parts.

Figure 5:
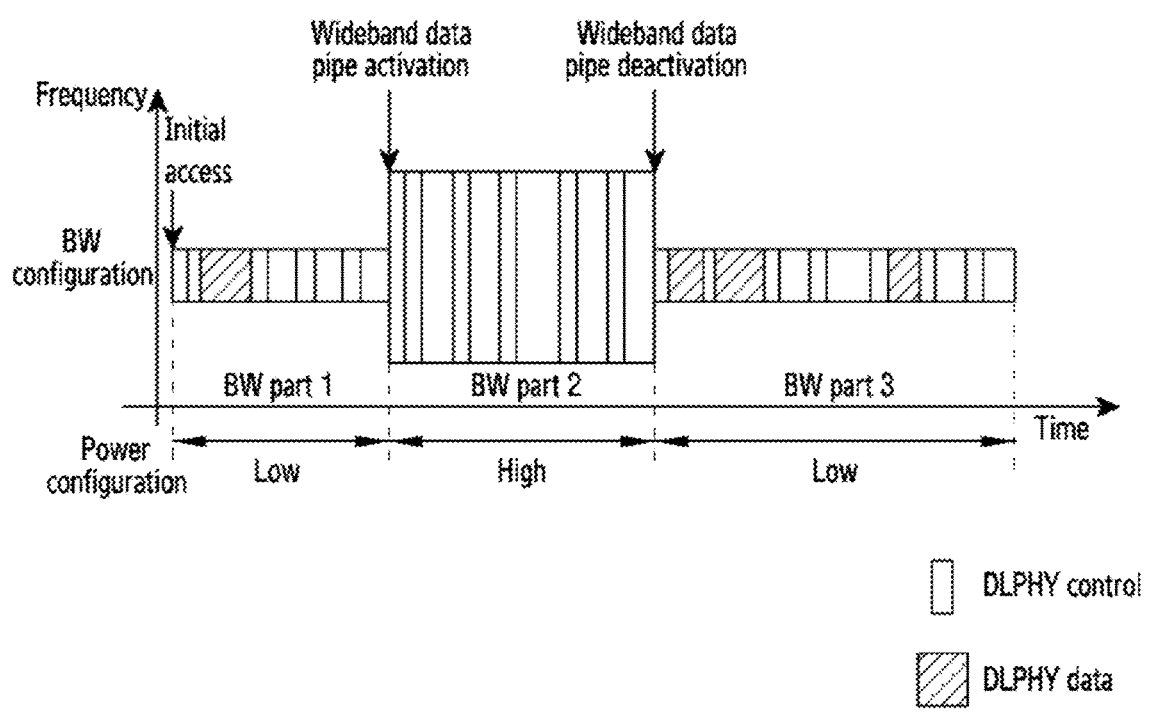
FIG. 5 illustrates an example for providing a SPS configuration to a UE by a cellular network according to the prior art.

In an example consider that the cellular network has performed the bandwidth part switching from a BW part 1 to a BW part 2 for the UE. While providing the SPS configuration to the UE, the cellular network configures the UE with dedicated uplink resources i.e., the cellular network indicates to the UE the periodicity at which the UE can send uplink packets through the cellular network without explicitly requesting for uplink grant resources from the cellular network. However, the SPS configuration is valid only for a specific bandwidth part. Therefore, when the UE switches from the BW part 1 to the BW part 2 (as shown in FIG. 5), the SPS configuration of the BW part 1 are no longer valid for the BW part 2. The SPS configuration does not adaptively change for the BW part 2. Similarly the UE procedures for providing the SR configuration also changes due to the bandwidth part switching.

Figure 6:
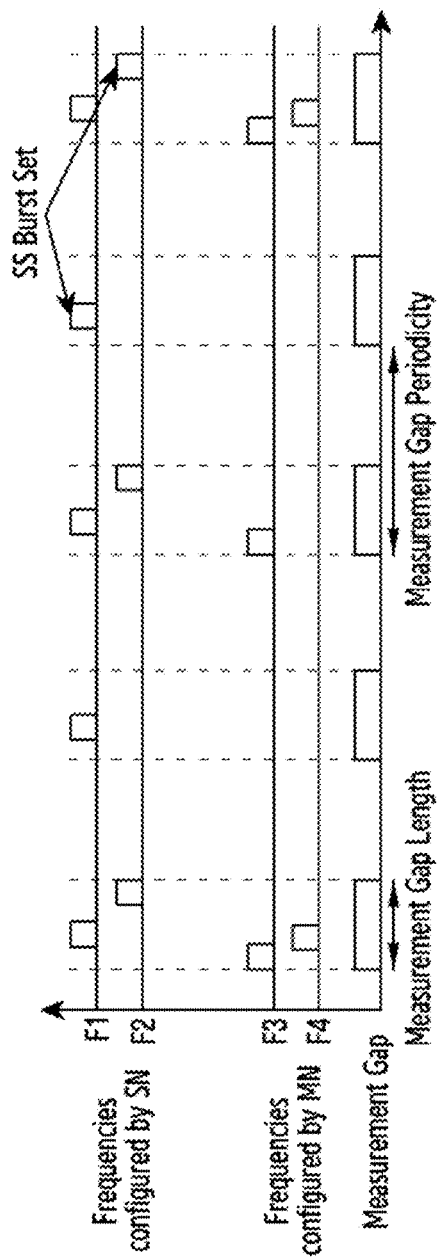
FIG. 6 illustrates an example of a method for providing a measurement gap to the UE by the cellular network according to the prior art.

In another example, consider the measurement gaps provided by multiple network nodes of the cellular network to the UE. The UE receives independent measurement gap configurations from each of the multiple network nodes such as a secondary node (SN) and a master node (MN) (as shown in FIG. 6). Therefore, the UE does not receive an optimal measurement gap as there is no coordination between the SN and the MN which provide the measurement gaps to the UE. Further, there is no mechanism by which the SN and the MN of the cellular network provide the measurement gap configurations for each bandwidth part, in case of bandwidth part switching.

Some aspects mentioned for bandwidth parts are also applicable for carrier aggregation, LTE and 5G cell aggregation using dual connectivity based architecture. For example, same methodology for measurement gap configuration is applied to LTE and 5G cell aggregation scenario.

Following conventions and terminologies are used:

a. Active bandwidth part: bandwidth part (DL or UL) where a UE is assumed to perform all uplink transmissions or all downlink receptions unless network allocates cross-bandwidth part dynamic resources to the UE. The UE can be configured with multiple active bandwidth parts, but in the provided method the focus is on single active bandwidth part. Hence, switching or changing a specific active bandwidth part (from bandwidth part A to bandwidth part B) implies that the UE has stopped transmission/reception of bandwidth part A and is now performing transmission reception on bandwidth part B;

b. Default bandwidth part: when change in active bandwidth part is autonomously triggered by the UE (i.e. without network command) as a fallback operation, the new active bandwidth part is referred to as default bandwidth part. Information about default bandwidth part is configured by the network;

c. RAT: Radio access technology;

d. Activation/Deactivation of SPS/SR resource: Activation/Deactivation of SPS/SR resource indicates that whether the UE/network can perform transmission on given SPS/SR resource. If the SPS/SR resource is activated then the UE/network can start using and perform transmission on the given SPS/SR resource. If the SPS/SR resource is deactivated then the UE/network stops using or cannot perform transmission on the given SPS/SR resource until resource is activated again. "Activation" of a resource is synonymous to "(re)initialization" of a resource and "deactivation" of a resource is synonymous to "suspension" of a resource for the case of the SPS resource which does not require DCI/MAC control element (MAC CE) command for activation and is synonymous to "clearing grant" for the case of the SPS resource which require DCI/MAC CE command for activation;

e. FR1 and FR2: FR1 and FR2 are given by frequency ranges over which a 5G or LTE cell can operate. For e.g. FR1 (frequency range 1) can be defined as all carriers with center frequency smaller than 6 GHz and FR2 (frequency range 2) can be defined as all carrier with center frequency greater than 28 GHz; and f. In some of the procedures mentioned in the provided method, there are statements for e.g.: "If UE receives A (or B) message, then UE performs X (or Y) action." The statement implies following information:

i. "If UE receives A message, then UE performs X action;" and ii. "If UE receives B message, then UE performs Y action."

Accordingly embodiments herein provide a method and apparatus for performing data transmission and measurements on multiple bandwidth parts. The embodiments herein provide a method to perform scheduling and measurement procedure when UE is configured with multiple bandwidth parts and frequencies. The provided method includes SPS scheduling for multiple bandwidth parts: SPS resources allocation includes information about bandwidth part and serving cell where SPS transmissions can be performed by cellular network or UE. The issue concerns with the case where UE's active bandwidth part of a serving cell does not contain SPS resources. In such scenario, what are actions performed by UE for SPS transmission/reception. Following solutions are provided as embodiments, In an embodiment, if no SPS resource is allocated to the UE in active bandwidth part of the serving cell and at least one SPS resource is activated in the given serving cell, then UE performs skipping of grants for the activated SPS resource (i.e. UE skips uplink SPS grants or does not try to receive downlink transmissions in downlink SPS resource).

In an embodiment, if the UE has at least one SPS resource which is activated in current active bandwidth part "X" of the serving cell and UE's active bandwidth part changes/switches or the given serving cell is deactivated by which bandwidth part "X" of the given serving cell is no longer active, the UE performs autonomous deactivation of SPS resources which were previously activated. Also, after changing/switching active bandwidth part or activation of the given serving cell by which bandwidth part "X" becomes active, the UE can autonomously activate SPS resources which are allocated to the current active bandwidth part "X" of the given serving cell.

In an embodiment, wherein if no SPS resource is allocated to the UE in active bandwidth part of a serving cell and at least one SPS resource is activated in the given serving cell: (i) If there is no transmission (or reception) scheduled in the active bandwidth part then UE can perform transmission (or reception) in the activated SPS resource; (ii) otherwise UE skips SPS transmission (or reception) in the activated SPS resource.

In an embodiment, the UE can be configured with multiple SPS resources in different bandwidth parts (which may belong to same or different serving cells) which can be part of single SPS configuration. If one of the activated SPS configuration has resource allocation in UE's active bandwidth part "X" of a serving cell: (i) If UE changes to a new active bandwidth part "Y" of the given serving cell (by which bandwidth part "X" of the given serving cell is no longer active) which also contains resources for the activated SPS configuration, then UE can activate and perform transmission (or reception) using the given SPS configuration with the resources allocated for the new active bandwidth part "Y" of the given serving cell and UE performs autonomous deactivation of resources allocated in bandwidth part "X" of the given serving cell; (ii) Otherwise UE perform autonomous SPS deactivation of any SPS resource activated in bandwidth part "X" of the given serving cell.

Accordingly embodiments herein provide a method and apparatus for performing data transmission and measurements on multiple bandwidth parts. SR transmission for multiple bandwidth parts: SR resource allocation includes information about bandwidth part where SR transmissions can be performed by UE. The issue concerns with the case where UE's active bandwidth part for a serving cell does not contain SR resources. In such scenario, what are actions performed by UE for SR transmission. Following solutions are provided as embodiments.

In an embodiment, if the UE has at least one SR resource which is activated in current active bandwidth part "X" of a serving cell and the UE's active bandwidth part changes/switches by which bandwidth part "X" of the given serving cell is no longer active, the UE stops using or performs autonomous deactivation of SR resources which were previously activated in bandwidth part "X" of the given serving cell. Also, after changing/switching active bandwidth part by which bandwidth part "X" of the given serving cell becomes active, the UE can start using or autonomously activate SR resources which are allocated to the current active bandwidth part "X" of the given serving cell.

In an embodiment, the UE can be configured with multiple SR resources in different bandwidth parts (which may belong to same of different serving cells) which can be part of single SR configuration. If one of the activated SR configuration has resource allocation in the UE's active bandwidth part "X" of a serving cell: (i) If the UE changes to a new active bandwidth part "Y" of the given serving cell (by which bandwidth part "X" of the given serving cell is no longer active) which also contains resources for the activated SR configuration, then the UE can perform transmission using the given SR configuration with the resources allocated for the new active bandwidth part "Y" of the given serving cell and the UE stops using any SR resource activated in bandwidth part "X" of the given serving cell; (ii) Otherwise the UE can stop using any SR resources activated in bandwidth part "X" of the given serving cell.

Accordingly embodiments herein provide a method and system to perform scheduling and measurement procedure when the UE is configured with multiple bandwidth parts and frequencies, where one bandwidth part is controlled by master node (MN) and another bandwidth part is controlled by secondary node (SN). Note that the MN and the SN can correspond to same entity. Measurement gap configuration for dual connectivity (DC) operation (e.g. LTE-5G carrier aggregation or multi-rAT dual connectivity or 5G dual connectivity): the UE can be configured with dual connectivity where both master node (MN) and secondary node (SN) can configure independent measurements to UE. Note that the MN and the SN can belong to same or different RATs. For measurement gap configuration to the UE, one node needs to understand the measurement gap requirement based on the measurements configured by other node. For instance, measurements configured by the MN can include frequencies which need to be measured by RF chain controlled by the SN, in such case the SN transmissions may stop when the MN configured measurements need to be performed.

In an embodiment, there is signaling exchange between the MN and the SN (i.e. either the MN signals the SN and/or the SN signals the MN) where source node (MN or SN) provides information to target node (SN or MN) about one or more of following: (i) the UE capability to support single or multiple measurement gaps; (ii) the UE capability indicating whether a measurement gap is required to measure a given frequency for a given cell configuration (iii) Frequency carriers configured by the source node to the UE for measurements; (iv) SS burst set occasions (time offset and periodicity) for each frequency carrier configured by the source node to UE for measurements; (v) Desired measurement gap pattern (measurement gap time offset, measurement gap periodicity, measurement gap length and measurement gap type) for each frequency carrier to be configured by target node; (vi) Cell configuration or carrier aggregation band combination configured by the source node to the UE; and (vii) CSI-RS measurement configuration (e.g. CSI-RS transmissions occasions, time offset and periodicity) for each frequency carrier configured by the source node to the UE for measurements.

In an embodiment, the UE provides information to the MN and/or the SN about one or more of following in order to allow the MN and/or the SN to configure measurement gap: (i) the UE capability to support single or multiple measurement gaps; (ii) the UE capability indicating whether a measurement gap is required to measure a given frequency or bandwidth part for a given cell configuration; (iii) The UE reports to the SN (or the MN) about frequency carriers for measurements and serving cells configured by the MN (or the SN); (iv) The UE reports to the SN (or MN) about SS burst set occasions (time offset and periodicity) or CSI-RS configuration (e.g. CSI-RS transmissions occasions, time offset and periodicity) for each frequency carrier configured by the MN (or the SN) for measurements; and (v) The UE reports to the SN (or the MN) about desired measurement gap pattern (measurement gap time offset, measurement gap periodicity, measurement gap length and measurement gap type) for each cell configured by the SN (or the MN).

Accordingly embodiments herein provide a method and system to perform scheduling and measurement procedure when the UE is configured with multiple bandwidth parts and frequencies. Pre-processing for uplink split bearer: For a split bearer which is configured to the UE for uplink data transmission: (i) packet data convergence protocol (PDCP) packet data units (PDU) are forwarded to radio link control (RLC) entities connected to the PDCP entity before reception of uplink grant. Ratio of amount of data which is forwarded between the RLC entities is either configured by cellular network or is a function of ratio of data rates observed by the UE between the links which contains the RLC entities; (ii) Number of PDCP PDUs which are forwarded to each RLC entity is either configured by cellular network or is a function of observed data rate of the link containing the RLC entity; (iii) After expiry of a timer, whose length can be a function of maximum number of SR transmissions in a given link after which SR resources are released, all the buffered RLC packets are forwarded to other RLC entity which is connected to the source PDCP entity; and (iv) Transmission of PDCP status report by the receiving PDCP entity based on either (a) Expiry of PDCP reordering timer or (b) Number of missing PDCP packets becomes greater than a threshold.

In an embodiment, wherein SPS is referred to as semi-persistent resource where the UE is allocated time periodic radio resources for transmission/reception. There are two types of SPS resource allocation: 1) Entire radio resource configuration is provided by radio resource control (RRC) configuration and the UE can perform transmission/reception on SPS resource after the UE receives RRC configuration, 2) Part of radio resource configuration is provided by RRC configuration and remaining radio resource configuration is provided using a Layer-1 or medium access control (MAC) command message and the UE can begin transmission/reception on SPS resource after receiving Layer-1 or MAC command message. The specification may use a different terminology for SPS, however, the methods described in the provided method are applicable for any radio resource allocation which are similar to SPS.

In an embodiment, the procedures and message formats present in the provided method are applicable to other cellular technologies as well for example long term evolution (LTE), 5G, etc.

Accordingly embodiments herein provide a method and system to perform scheduling and measurement procedure when the UE is configured with multiple bandwidth parts and frequencies. The provided method includes the SPS Scheduling for Multiple Bandwidth Parts: SPS resources allocation includes information about a bandwidth part and the serving cell where SPS transmissions can be performed by cellular network or the UE. The issue concerns with the case where the UE's active bandwidth part in the serving cell does not contain the SPS resources. In such scenario, what are actions performed by the UE for SPS transmission/reception.

Accordingly embodiments herein provide a method and system to perform scheduling and measurement procedure when the UE is configured with multiple bandwidth parts and frequencies. SR transmission for multiple bandwidth parts: SR resource allocation includes information about bandwidth part and the serving cell, where SR transmissions can be performed by the UE. The issue concerns with the case where the UE's active bandwidth part in the serving cell does not contain SR resources. In such scenario, what are actions performed by the UE for SR transmission.

Accordingly embodiments herein provide a method and system to perform scheduling and measurement procedure when the UE is configured with multiple bandwidth parts and frequencies. Measurement gap configuration for dual connectivity (e.g. LTE-5G carrier aggregation or Multi-RAT dual connectivity or 5G dual connectivity): the UE can be configured with dual connectivity where both the master node (MN) and the secondary node (SN) can configure independent measurements to the UE. Note that the MN and the SN can belong to different RATs. For measurement gap configuration to the UE, one node needs to understand the measurement gap requirement based on the measurement configured by other node. For instance, measurements configured by the MN can include frequencies which need to be measured by the RF chain controlled by the SN, in such case the SN transmissions may stop when the MN configured measurements need to be performed.

Accordingly embodiments herein provide a method and system to perform scheduling and measurement procedure when the UE is configured with multiple bandwidth parts and frequencies. Measurement gap configuration for multiple bandwidth parts: the UE can be configured with multiple bandwidth parts, where each bandwidth part may require the UE to perform measurements. For measurement gap configuration to the UE, serving node needs to understand the measurement gap requirement for each active bandwidth part of the UE, which depends on measurements to be performed by the RF chains in use by active bandwidth part.

Accordingly embodiments herein provide a method and system to perform scheduling and measurement procedure when the UE is configured with multiple bandwidth parts and frequencies. Pre-processing for uplink split bearer: For a split bearer which is configured to the UE for uplink data transmission: (i) PDCP PDUs are forwarded to RLC entities connected to the PDCP entity before reception of uplink grant. Ratio of amount of data which is forwarded between the RLC entities is either configured by cellular network or is a function of ratio of data rates observed by the UE between the links which contains the RLC entities; (ii) Number of PDCP PDUs which are forwarded to each RLC entity is either configured by cellular network or is a function of observed data rate of the link containing the RLC entity; (iii) After expiry of a timer, whose length can be a function of maximum number of SR transmissions in a given link after which SR resources are released, all the buffered RLC packets are forwarded to other RLC entity which is connected to the source PDCP entity; (iv) Transmission of PDCP status report by the receiving PDCP entity based on either (a) Expiry of PDCP reordering timer or (b) Number of missing PDCP packets becomes greater than a threshold.

Referring now to the drawings, and more particularly to FIGS. 3 through 16, there are shown preferred embodiments.

Figure 7:
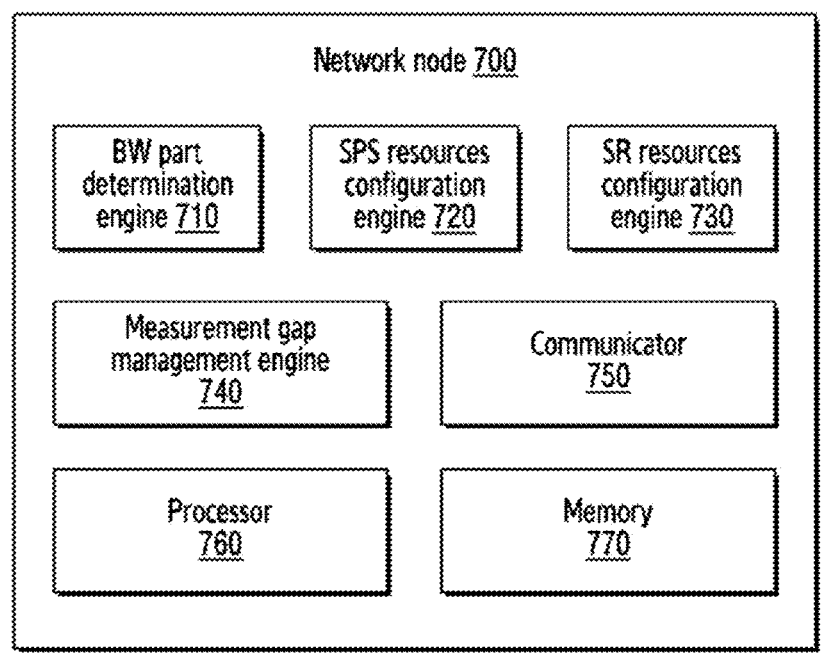
FIG. 7 illustrates a block diagram of a network node for performing data transmission and measurements on wide bandwidth according to an embodiment as disclosed herein.

FIG. 7 illustrates a block diagram of the network node 700 for performing data transmission and measurements on the wide bandwidth according to an embodiment as disclosed herein.

Referring to the FIG. 7, the network node 700 can also called as one of the base station, the master node and the secondary node.

The network node 700 includes a BW part determination engine 710, an SPS resources configuration engine 720, an SR resources configuration engine 730, a measurement gap management engine 740, a communicator 750, a processor 760, and a memory 770.

In an embodiment, the BW part determination engine 710 is configured to determine the one or more bandwidth parts configured to the UE.

In an embodiment, the SPS resources configuration engine 720 is configured to dynamically arrange the SPS resources for one or more bandwidth parts configured to the UE. The SPS resources configured to the UE includes the common configuration and the bandwidth part specific configuration. The common configuration applicable to the one or more bandwidth parts are configured to the UE. The one or more bandwidth part specific configurations is associated to the individual bandwidth part configured to the UE. The common configuration includes at least a SPS cell radio network temporary identifier (SPS C-RNTI). Further, the bandwidth part specific configuration includes at least one of a bandwidth part index, periodicity of SPS resource, time domain SPS resources, frequency domain SPS resources and demodulation reference signal (DMRS) resources for SPS.

In an embodiment, the SR resources configuration engine 730 is configured to configure the SR resources for the one or more bandwidth parts configured to the UE. The SR configuration includes a common configuration which is applicable to the bandwidth parts configured to the UE. Further, the SR configuration also includes the one or more bandwidth part specific configurations which are associated to the individual bandwidth part configured to UE. The common configuration includes at least a SR configuration identity, dsr-TransMax parameter indicating maximum SR transmissions before a random access procedure is triggered, sr-ProhibitTimer indicating minimum time difference between successive SR transmissions, set of logical channels for which the SR can be triggered. Further, the bandwidth part specific configurations includes at least the bandwidth part index, physical uplink control channel (PUCCH) parameters and the radio resource configuration of the SR within the PUCCH resources.

In an embodiment, the measurement gap management engine 740 is configured to determine the desired measurement gap configuration to be indicated to the UE, based on the first list of frequencies and the second list of frequencies. Further, the measurement gap management engine 740 is also configured to indicate a time interval, a time offset and periodicity associated with reference signals transmitted to the UE along with the measurement gap for each frequency.

In an embodiment, the measurement gap management engine 740 is configured to configure a list of frequencies for measurements to the UE. The list of frequencies include a frequency identifier and at least one of a time interval, a time offset and a periodicity associated with reference signals, for each frequency for which a measurement gap is required by the UE. Further, the measurement gap management engine 740 is also configured to indicate to the UE the one or more measurement gaps based on the received measurement gap assistance information. The measurement gap assistance information includes at least one of measurement gap capability information of the UE, a list of frequencies and a desired measurement gap configuration from the UE. Further, the measurement gap capability information of the UE includes a number of measurement gaps supported by the UE and a frequency range or bandwidth associated with each supported measurement gap. The desired measurement gap configuration includes of one or more measurement gap patterns required to measure frequencies configured to the UE, wherein the UE indicates the frequency range and the bandwidth associated with each measurement gap pattern. Further, each measurement gap pattern configured by the network node 700 to the UE is associated with at least one of a bandwidth part configured to the UE, serving cell configured to the UE, a cell group configured to the UE and a frequency range.

In an embodiment, the communicator 750 is configured to transmit the bandwidth part switching command to switch the UE from the first bandwidth part to the second bandwidth part. The bandwidth part switching command enables one of the autonomous deactivation of the SPS resources on the first bandwidth part and activation of the SPS resources on the second bandwidth part according to the bandwidth part specific configuration associated with the second bandwidth part.

In another embodiment, the communicator 750 is configured to receive the bandwidth part switching command which prohibits the transmission of the scheduling request using the PUCCH resources on the first bandwidth part and enables the transmission of the Scheduling Request using the PUCCH resources on the second bandwidth part according to the bandwidth part specific configuration associated with the second bandwidth part. Further, the communicator 750 is also configured to indicate a time interval, a time offset and a periodicity associated with reference signals, for each frequency from the list of configured frequencies for measurement, to the UE.

In another embodiment, the communicator 750 is configured to receive the measurement gap capability information from the UE. The measurement gap capability information of the UE includes the number of measurement gaps supported by the UE and a frequency range or bandwidth associated with each supported measurement gap.

Further, the communicator 750 is configured to transmit measurement gap assistance information to a secondary node (SN) and also to receive the measurement gap assistance information from the SN. Further, the communicator 750 is also configured to indicate the one or more measurement gaps to the UE based on a first list of frequencies configured by the MN, a second list of frequencies configured by the SN and the measurement gap assistance information received from the SN. The measurement gap assistance information transmitted from the MN to the SN includes parameters such as the measurement gap capability information received from the UE, a serving cell configuration of a master cell group (MCG), a MN configured measurement parameters and a desired measurement gap configuration. The serving cell configuration of the MCG includes one or more of a band combination used in the MCG, the frequency carrier identity, the cell index value, a global cell identity and a physical cell identity for one or more serving cells of the MCG. The MN configured measurement parameters includes at least a frequency identifier, synchronization signal block measurement timing configuration and CSI-RS measurement configuration for one or more frequencies from the first list of frequencies configured to the UE. The desired measurement gap configuration includes of one or more measurement gap patterns required to measure first list of frequencies, wherein the MN indicates frequency range and bandwidth associated with each measurement gap pattern. The measurement gap assistance information transmitted from the SN to the MN includes a serving cell configuration of a secondary cell group (SCG), a SN configured measurement parameters and a desired measurement gap configuration.

The communicator 750 is also configured to send the serving cell configuration to the SN when the UE is reconfigured with a new cell configuration by the MN. The serving cell configuration of a SCG includes one or more of a band combination used in SCG, frequency carrier identity, cell index value, a global cell identity and a physical cell identity for one or more serving cells of a SCG. Furthermore, the communicator 750 is also configured to send serving cell configuration to the MN when the UE is reconfigured with a new cell configuration by the SN, when the network node is the SN. The SN configured measurement parameters includes of at least a frequency identifier, synchronization signal block measurement timing configuration and CSI-RS measurement configuration for one or more frequencies from the second list of frequencies configured to the UE. The each of the measurement gap pattern configured by the MN or the SN to the UE is associated with at least a bandwidth part configured to the UE, serving cell configured to the UE, cell group configured to the UE and a frequency range.

In an embodiment, the processor 760 (for example: a hardware unit, an apparatus, a central processing unit (CPU), a graphics processing unit (GPU), etc.,) communicatively coupled to a memory 770 (e.g., a volatile memory and/or a non-volatile memory); the memory 770 includes storage locations configured to be addressable through the processor 760.

In an embodiment, the memory 770 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 770 may, in some examples, be considered a non-transitory storage medium. The term "non-transitory" may indicate that the storage medium is not embodied in a carrier wave or a propagated signal. However, the term "non-transitory" may not be interpreted that the memory 770 is non-movable. In some examples, the memory 770 can be configured to store larger amounts of information than the memory. In certain examples, a non-transitory storage medium may store data that can, over time, change (e.g., in random access memory (RAM) or cache).

Although the FIG. 7 shows the hardware elements of the network node 700 but it is to be understood that other embodiments are not limited thereon. In other embodiments, the network node 700 may include less or more number of elements. Further, the labels or names of the elements are used only for illustrative purpose and does not limit the scope of the disclosure. One or more components can be combined together to perform same or substantially similar function for performing data transmission and measurements on wide bandwidth.

Figure 8:
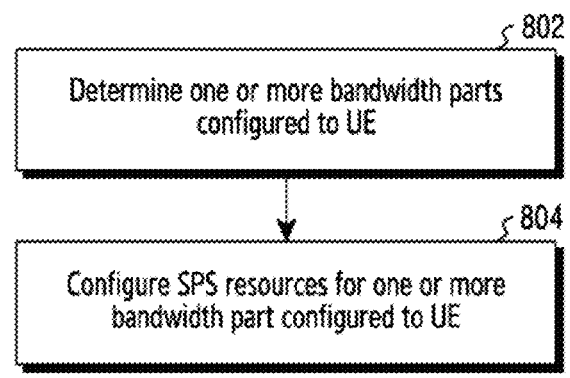
FIG. 8 illustrates a flow chart of a method for configuring a semi-persistent scheduling (SPS) resources to the UE in a wireless communication system according to an embodiment as disclosed herein.

FIG. 8 illustrates a flow chart 400 of a method for configuring the SPS resources to the UE in the wireless communication system according to an embodiment as disclosed herein.

Referring to the FIG. 8, at step 802, the network node 700 determines the one or more bandwidth parts configured to the UE. For example, in the network node 700 as illustrated in the FIG. 7, the BW part determination engine 710 can be configured to determine the one or more bandwidth parts configured to the UE.

At step 804, the network node 700 configures the SPS resources for one or more bandwidth parts configured to the UE. For example, in the network node 700 as illustrated in the FIG. 7, the SPS resources configuration engine 720 can be configured to configure the SPS resources for one or more bandwidth parts configured to the UE.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 9:
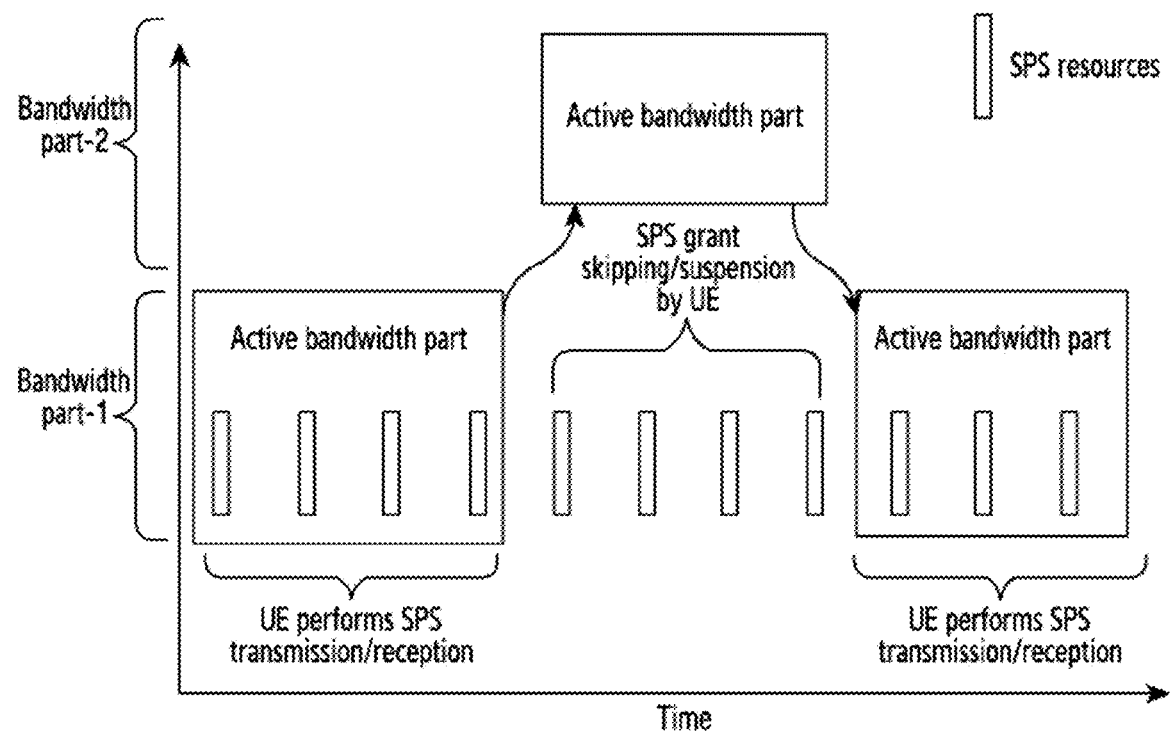
FIG. 9 illustrates a graph of the UE procedure to skip a SPS transmissions/receptions when active bandwidth part changes or activates or deactivates for a serving cell according to an embodiment as disclosed herein.

FIG. 9 illustrates a graph of the UE procedure to skip SPS transmissions/receptions when active bandwidth part changes or activates or deactivates for a serving cell according to an embodiment as disclosed herein.

Figure 10:
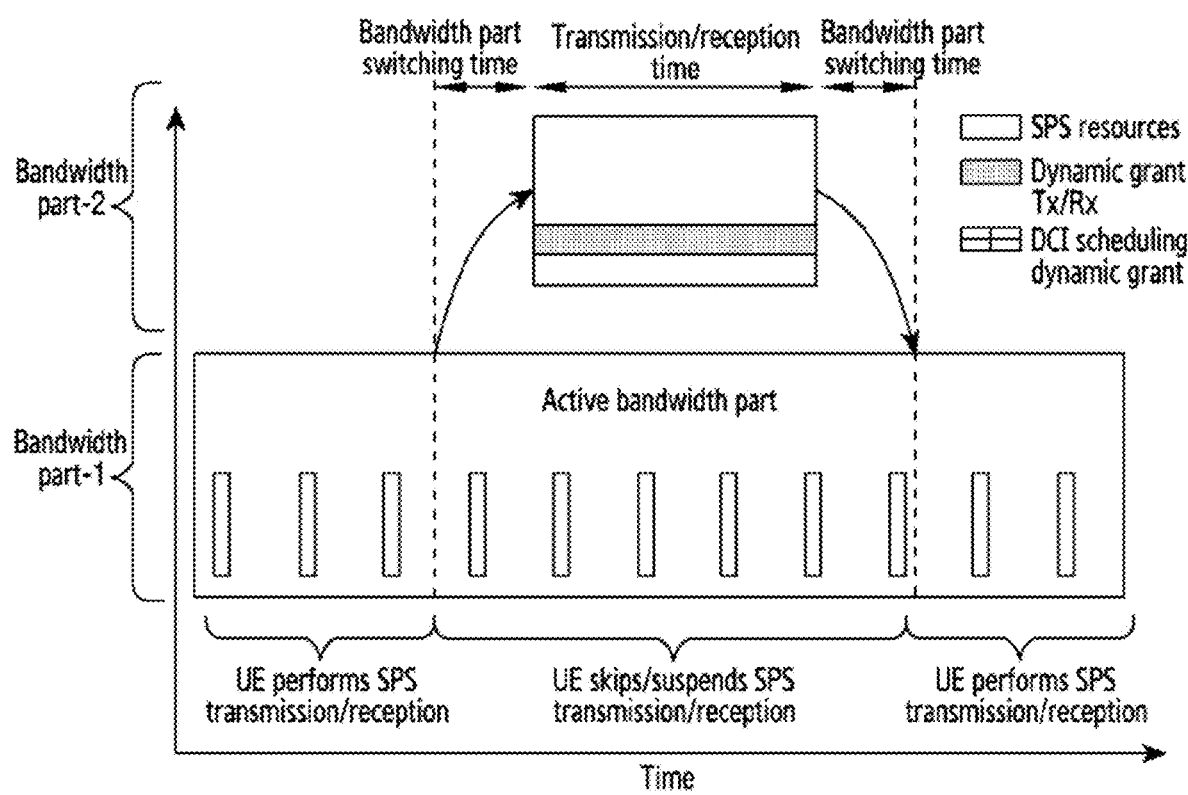
FIG. 10 illustrates a graph of the UE procedure to skip the SPS transmissions/receptions when the UE receives dynamic grant, according to an embodiment as disclosed herein.

FIG. 10 illustrates a graph of the UE procedure to skip or suspend SPS transmissions/receptions when the UE receives dynamic grant according to an embodiment as disclosed herein.

In 5G, radio resource allocation of dynamic grants is relative to a bandwidth part. Hence, if the SPS resource allocation also follows the same approach, the SPS resources are invalidated when the UE changes to a different bandwidth part where the SPS is not configured and the UE is not allowed to transmit/receive in the bandwidth part where the SPS is configured (this can be due to the UE capability to support single/multiple bandwidth parts). Further, the SPS resources allocation is assumed to include information about bandwidth part and serving cell where SPS transmissions can be performed by one of the cellular network and the UE.

Referring now to FIGS. 9 and 10, if the SPS resource is not allocated to the UE in the active bandwidth part of the serving cell and the at least one SPS resource is activated in the given serving cell, then UE performs suspension/skipping of grants for the activated SPS resource (i.e. the UE skips or suspends uplink SPS grants or does not try to receive or suspend downlink transmissions in downlink SPS resource). The suspension/skipping is considered a state of the UE where the UE cannot use the SPS resource even when the SPS resource is activated.

The UE can determine the bandwidth part and the serving cell where the UE performs transmission/reception of the SPS resource. This can be indicated to the UE by RRC configuration when the UE is not required to receive Layer-1/MAC command message to initiate the SPS transmission/reception. When the UE is required to receive Layer-1/MAC command message to initiate the SPS transmission/reception, the bandwidth part and the serving cell information can either be provided to the UE using (a) RRC configuration of SPS or (b) Included in Layer-1/MAC command message which activates the SPS resource or (c) Same bandwidth part is used for the SPS transmission/reception where Layer-1/MAC command message is received.

If the UE is configured with an SPS configuration which does not contain uplink SPS resource in the UE's active bandwidth part of a serving cell and if at least one uplink radio resource of the SPS configuration is active in the given serving cell/associated supplementary uplink cell, the UE skips or suspends all SPS uplink grants for that SPS configuration. The UE can continue to perform uplink transmissions using the SPS configuration if the UE's active bandwidth part becomes/is a bandwidth part of the given the serving cell where the SPS resources are allocated for the given the SPS configuration and are activated.

If the UE is configured with an SPS configuration which does not contain downlink SPS resource in the UE's active bandwidth part of a serving cell and if at least one downlink radio resource of SPS configuration is active in the given serving cell, the UE skips or suspends all SPS downlink grants for that SPS configuration. The UE can continue to receive downlink transmissions using the SPS configuration if the UE's active bandwidth part becomes a bandwidth part of the given the serving cell where the SPS resources are allocated for the given SPS configuration and are activated.

The UE skips or suspends transmission on an activated SPS grant if an uplink dynamic grant transmission overlaps in time domain with the SPS transmission in the same serving cell/supplementary uplink cell. An SPS grant occasion is said to be overlapped with dynamic uplink grant if any of the following part of dynamic uplink grant transmission is overlapped in time domain with uplink SPS grant occasion:

a. Time duration for the UE to switch to bandwidth part where dynamic uplink transmission is to be performed;

b. Dynamic uplink grant time duration (i.e. time for transmission); and c. Time duration for the UE to switch back to active or default bandwidth part after performing dynamic uplink transmission.

The UE skips or suspends reception on the activated SPS grant if a downlink dynamic grant reception overlaps in time domain with the SPS reception in the same serving cell. An SPS grant occasion is said to be overlapped with dynamic downlink grant if any of the following part of dynamic downlink grant reception is overlapped in time domain with downlink SPS grant occasion:

a) Time duration for the UE to switch to bandwidth part where dynamic downlink reception is to be performed. The time duration is defined based on the UE's capability to switch bandwidth parts or can be configured by the cellular network.

b) Dynamic downlink grant time duration (i.e. time for reception)

c) Time duration for the UE to switch back to active or default bandwidth part after performing dynamic downlink reception.

Figure 11:
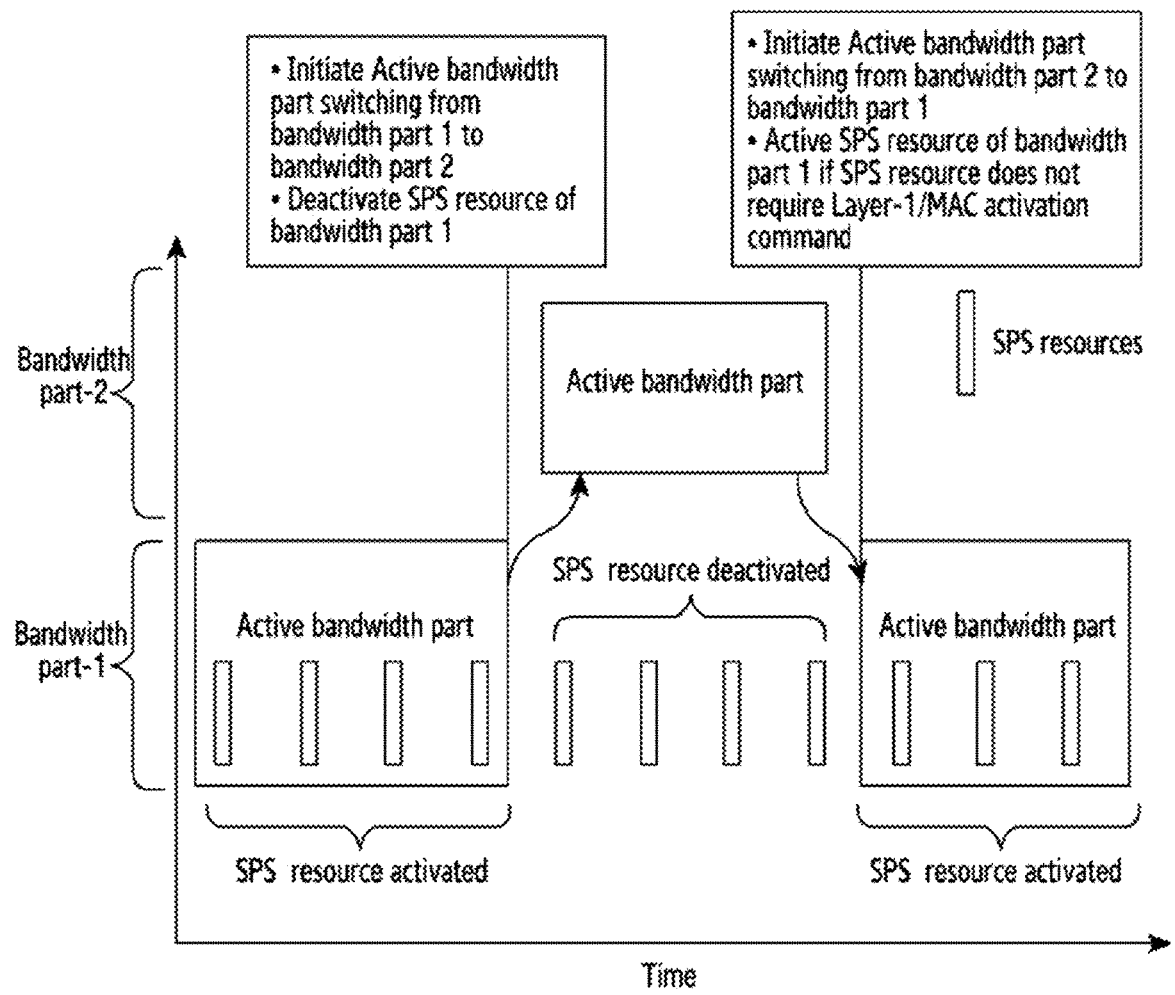
FIG. 11 illustrates a graph of the UE procedure to autonomously activate/deactivate the SPS resource when active bandwidth part changes or activates or deactivates for the serving cell according to embodiment as disclosed herein.

FIG. 11 illustrates a graph of the UE procedure to autonomously activate/deactivate the SPS resource when active bandwidth part changes or activates or deactivates for the serving cell according to embodiment as disclosed herein.

Referring now to FIG. 11, If the UE has at least one SPS resource which is activated in current active bandwidth part "X" of a serving cell and the UE's active bandwidth part changes/switches or given serving cell is deactivated or cell switching occurs due to supplementary uplink operation by which bandwidth part "X" of given serving cell is no longer active, the UE performs autonomous deactivation of SPS resources which were previously activated in bandwidth part "X" of given serving cell. Also, after changing/switching active bandwidth part or activation of given serving cell or cell switching occurs due to supplementary uplink operation due to which bandwidth part "X" of the given serving cell becomes active, the UE can autonomously activate SPS resources which are allocated to the current active bandwidth part "X" of the given serving cell.

The UE can determine the bandwidth part and serving cell where the UE performs transmission/reception of an SPS resource. This can be indicated to the UE by RRC configuration when the UE is not required to receive Layer-1/MAC command message to initiate the SPS transmission/reception. When the UE is required to receive Layer-1/MAC command message to initiate the SPS transmission/reception, bandwidth part information can either be provided to the UE using (a) RRC configuration of SPS or (b) Included in Layer-1/MAC command message which activates SPS resource or (c) Same bandwidth part is used for SPS transmission/reception where Layer-1/MAC command message is received.

If the UE is configured with an SPS configuration which contains an activated uplink SPS resource in the UE's active bandwidth part "X" of a serving cell and if the UE changes the UE's bandwidth part or given serving cell is deactivated or cell switching occurs due to supplementary uplink operation due to which bandwidth part "X" of the given serving cell is no longer active and the new active bandwidth part "Y" of the given serving cell does not contain any uplink SPS resource for the given SPS configuration, then the UE performs autonomous deactivation of uplink SPS resources present in the previous active bandwidth part "X" of the given serving cell for the given SPS configuration. Autonomous deactivation involves the UE to stop any transmission on resources of SPS configuration unless SPS resources are activated again.

If the UE is configured with an SPS configuration which contains an activated downlink SPS resource in the UE's active bandwidth part of a serving cell and if the UE changes the UE's bandwidth part or given serving cell is deactivated due to which bandwidth part "X" of the given serving cell is no longer active and the new active bandwidth part "Y" of the given serving cell does not contain any downlink SPS resource for the given SPS configuration, then the UE performs autonomous deactivation of downlink SPS resources present in the previous active bandwidth part "X" of the given serving cell for the given the SPS configuration. Autonomous deactivation involves the UE to stop any reception on resources of the SPS configuration unless the SPS resources are activated again.

If the UE is configured with an SPS configuration which does not contain any uplink SPS resource in the UE's active bandwidth part "Y" of a serving cell and if the UE changes the UE's bandwidth part or if the given serving cell is activated or cell switching occurs due to supplementary uplink operation due to which bandwidth part "Y" of the given serving cell is no longer active and the new active bandwidth part "X" of the given serving cell contains an uplink SPS resource for the given SPS configuration, then the UE performs autonomous activation (i.e. the UE can initiate transmission of SPS resource without reception of Layer-1/MAC activation command) of uplink SPS resources present in the new active bandwidth part "X" of the given serving cell for the given the SPS configuration according to one or more of the following:

a. The UE performs autonomous activation of the SPS resource irrespective of type of the SPS configuration or any previous activation status of the SPS resource. For the case when autonomous activation is for the SPS resources which require Layer-1/MAC command message to activate the SPS resource, UE uses the same timing reference for the SPS and HARQ occasion calculation as used during the previous instance when the given the SPS resource was activated;

b. The UE only performs autonomous activation of the SPS resource belonging to the SPS configuration for which the UE is not required to receive Layer-1/MAC command message to activate the SPS resource; and c. The UE only performs autonomous activation of the SPS resource which were deactivated by the UE using autonomous deactivation procedure (i.e. the UE autonomously deactivated the SPS resource after changing the UE's active bandwidth part as mentioned in 2). For the case when autonomous activation is for the SPS resources which require Layer-1/MAC command message to activate the SPS resource, the UE uses the same timing reference for the SPS and HARQ occasion calculation as used during the previous instance when the given the SPS resource was activated.

If the UE is configured with an SPS configuration which does not contain any downlink SPS resource in the UE's active bandwidth part "Y" of a serving cell and if the UE changes the UE's bandwidth part or the given serving cell is activated due to which bandwidth part "Y" of the given serving cell is no longer active and the new active bandwidth part "X" of the given serving cell contains a downlink SPS resource for the given SPS configuration, then the UE performs autonomous activation (i.e. the UE can initiate reception of SPS resource without reception of Layer-1/MAC activation command) of downlink SPS resources present in the new active bandwidth part "X" of the given serving cell for the given the SPS configuration according to one or more of the following:

a) The UE performs autonomous activation of the SPS resource irrespective of type of the SPS configuration or any previous activation status of the SPS resource. For the case when autonomous activation is for the SPS resources which require Layer-1/MAC command message to activate the SPS resource, the UE uses the same timing reference for the SPS and HARQ occasion calculation as used during the previous instance when the given the SPS resource was activated;

b) The UE only performs autonomous activation of the SPS resource belonging to the SPS configuration for which the UE is not required to receive Layer-1/MAC command message to activate the SPS resource; and c) The UE only performs autonomous activation of the SPS resource which were deactivated by the UE using autonomous deactivation procedure (i.e. the UE autonomously deactivated the SPS resource after changing the UE's active bandwidth part as mentioned in 3). For the case when autonomous activation is for the SPS resources which require Layer-1/MAC command message to activate the SPS resource, UE uses the same timing reference for the SPS and HARQ occasion calculation as used during the previous instance when the given the SPS resource was activated.

The UE triggers autonomous activation/deactivation procedure when one or more of the following events occur:

a) The UE receives a Layer-1/MAC/RRC message indicating to change the UE's active bandwidth part for a serving cell;

b) The UE sends acknowledgement to network indicating change in the UE's active bandwidth part for a serving cell;

c) Expiration of a timer which triggers autonomous change of active bandwidth part for a serving cell of the UE; and d) When the UE completes switches to a new active bandwidth part for the serving cell (i.e. the UE can initiate transmission/reception instantaneously).

Figure 12:
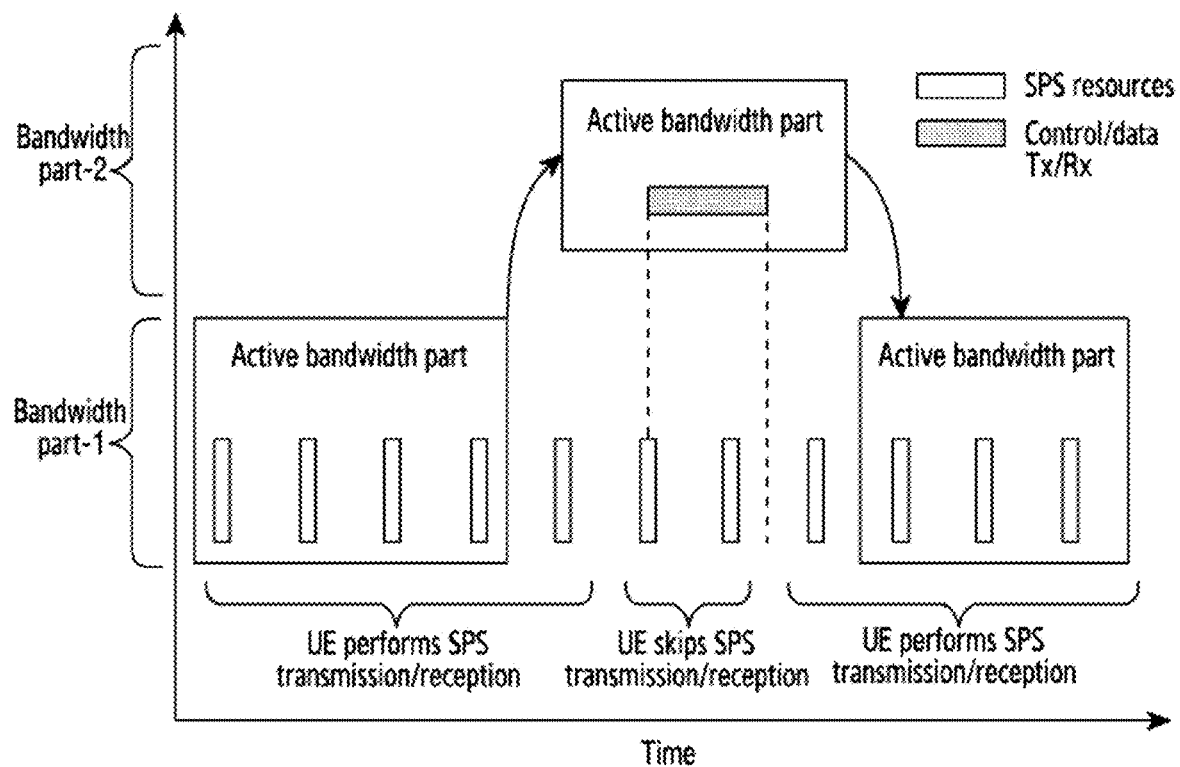
FIG. 12 illustrates a graph of the UE procedure of selective skipping the SPS transmissions/receptions when active bandwidth part changes or activates or deactivates for the serving cell according to the embodiment as disclosed herein.

FIG. 12 illustrates a graph of the UE procedure of selective skipping the SPS transmissions/receptions when active bandwidth part changes or activates or deactivates for the serving cell according to the embodiment as disclosed herein. Referring now to FIG. 12, if the SPS resource is not allocated to the UE in active bandwidth part of the serving cell and at least one SPS resource is activated, then the UE can perform transmission of the activated SPS resource if no transmission/reception is scheduled in the active bandwidth part of the UE.

The UE can determine the bandwidth part and the serving cell where the UE performs transmission/reception of the SPS resource. This can be indicated to the UE by RRC configuration when the UE is not required to receive Layer-1/MAC command message to initiate the SPS transmission/reception. When the UE is required to receive Layer-1/MAC command message to initiate the SPS transmission/reception, bandwidth part information can either be provided to the UE using (a) RRC configuration of the SPS, (b) Included in Layer-1/MAC command message which activates the SPS resource, or (c) Same bandwidth part is used for the SPS transmission/reception where Layer-1/MAC command message is received.

If the UE is configured with the SPS configuration which does not contain the uplink SPS resource in the UE's active bandwidth part for the serving cell and if at least one uplink radio resource of the SPS configuration is active in the given serving cell, the UE can perform transmission on the given SPS resource if one or more of following is true:

a) The UE can perform transmission on the SPS resource if no transmission is scheduled on active bandwidth part of the given serving cell during the SPS occasion. The SPS occasion includes the SPS transmission time by UE and time taken by the UE to switch bandwidth parts;

b) The UE can perform transmission on the SPS resource if no physical layer control transmission (Sounding Reference Signal (SRS), Physical Uplink Control Channel (PUCCH), etc.) or data PDU (i.e. MAC PDU which does not only contain padding BSR and/or MAC Control Element (CE) padding) is scheduled on the active bandwidth part of the given serving cell during the SPS occasion. SPS occasion includes the SPS transmission time by the UE and time taken by the UE to switch bandwidth parts;

c) The UE can perform transmission on the SPS resource if no physical layer control transmission (SRS, PUCCH, etc.) is scheduled on active bandwidth part of the given serving cell during the SPS occasion. The SPS occasion includes the SPS transmission time by the UE and time taken by the UE to switch bandwidth parts;

d) The UE can perform transmission of the SPS resource if data to be scheduled in the SPS transmission has higher logical channel priority than data to be transmitted in overlapping transmission scheduled in active bandwidth part of the given serving cell. The decision can be taken after performing logical channel prioritization of the SPS grant and overlapping grant in active bandwidth part of the given serving cell;

e) The UE can perform transmission of SPS resource if the UE has data to transmit (i.e. MAC PDU which does not only contain padding BSR and/or MAC CE padding) irrespective of whether any transmission is scheduled in active bandwidth part of the given serving cell or not. The cellular network provides information (e.g. using a parameter in the SPS configuration) which indicates whether the UE can prioritize transmission of the SPS resource over transmission in active bandwidth part of the given serving cell;

f) The cellular network provides information (e.g. using a parameter in SPS configuration) whether the UE can perform transmission on the SPS resource when the UE's active bandwidth part of the given serving cell does not contain SPS resource. Otherwise the UE does not perform transmission on SPS resource when SPS resource is not present in the UE's active bandwidth part of the given serving cell; and g) If the SPS resource is present in bandwidth part where PUCCH resources are also present, then the UE can perform transmission of the SPS resource even if the UE's active bandwidth of the given serving cell part does not contain the SPS resource. Otherwise, the UE does not perform transmissions on the SPS resource if the SPS resource is not present in the UE's active bandwidth part of the given serving cell.

If the UE is configured with the SPS configuration which does not contain downlink SPS resource in UE's active bandwidth part of a serving cell and if at least one downlink radio resource of SPS configuration is active in the given serving cell, the UE can perform reception on the given SPS resource if one or more of following is true:

a) The UE can perform reception on the SPS resource if no reception is scheduled on active bandwidth part of the given serving cell during the SPS occasion. SPS occasion includes the SPS reception time by the UE and time taken by the UE to switch bandwidth parts;

b) The UE always perform reception of the SPS resource irrespective of whether any reception is scheduled in active bandwidth part of the given serving cell or not. Cellular network provides information (e.g. using a parameter in the SPS configuration) which indicates whether the UE can prioritize reception of SPS resource over reception in active bandwidth part of the given serving cell; and c) Cellular network provides information (e.g. using a parameter in SPS configuration) whether the UE can perform reception on SPS resource when the UE's active bandwidth part of the given serving cell does not contain SPS resource. Otherwise the UE does not perform reception on SPS resource when SPS resource is not present in the UE's active bandwidth part of the given serving cell.

SPS resources are determined by the UE in one of two ways when the SPS resource is not present within active bandwidth part:

h) SPS resource allocation is provided to the UE with respect to a bandwidth part, i.e. time and frequency resources for the SPS grants are determined based on center frequency of bandwidth part. Hence, when active bandwidth part of the UE does not contain SPS resource, then the UE determines the SPS resource using following:

i. The UE determines center frequency of bandwidth part for which SPS resource is applicable;

ii. The UE determines resource allocation of the SPS with respect to physical resource block-0 (PRB0) or reference PRB or center frequency of cell bandwidth; and iii. The UE determines the SPS resource with respect to the UE's active bandwidth part.

i) SPS resource allocation is provided to the UE with respect to PRB0 or reference PRB or center frequency of cell bandwidth.

Figure 13A:
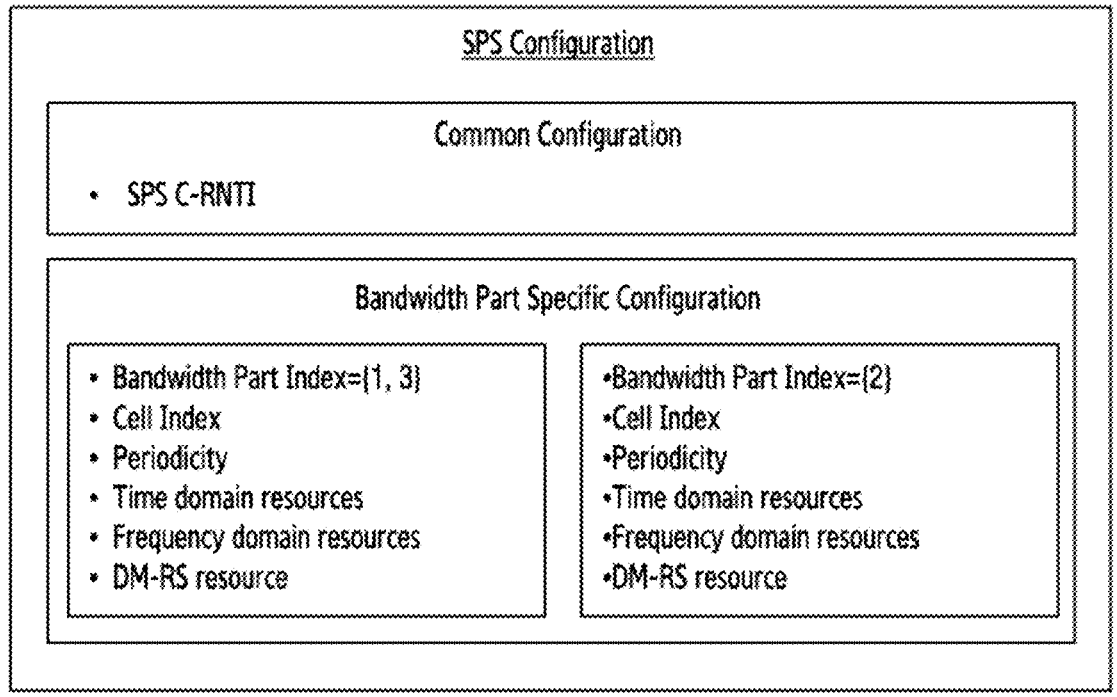
FIG. 13A illustrates a graph of a first example of a cellular network configuration of the SPS resources for different bandwidth parts where configuration is divided into a common and a bandwidth part specific parameter containers according to the embodiment as disclosed herein.

FIG. 13A illustrates a graph of first example of the cellular network configuration of the SPS resources for different bandwidth parts where configuration is divided into the common and the bandwidth part specific parameter containers according to the embodiment as disclosed herein.

FIG. 13B illustrates a graph of second example of the cellular network configuration of the SPS resources for different bandwidth parts where configuration is divided into the common and the bandwidth part specific parameter containers according to the embodiment as disclosed herein. Referring now to FIG. 13A and 13B, the UE can be configured with multiple SPS resources in different bandwidth parts (belong to same or different serving cell) which can be part of single SPS configuration. The UE selects the SPS resources for transmission/reception based on the UE's current active bandwidth part of a serving cell:

The SPS configuration of the UE includes of common and bandwidth specific parameters. Common parameters are applicable for all bandwidth parts of the UE. Bandwidth specific parameter values are only applicable to bandwidth parts and serving cells which are indicated along with the parameter value.

Parameters which are common to all bandwidth parts and all the SPS resources of the configuration can be one or more of following:

a. SPS C-RNTI: RNTI value used for SPS activation/deactivation and retransmission;

b. SPS periodicity: Time periodicity of the SPS resources; and c. Time offset: E.g. time offset value of SPS occasion from system frame number 0.

Parameters which are bandwidth specific can be one or more of following:

a) Multiple SPS resources can be configured for each bandwidth part for an SPS configuration, where each SPS resource may contain one or more of the following:

a. HARQ process ids for which the SPS resource is applicable for;

b. Logical channels for which the SPS resource is applicable for;

c. SPS periodicity: Time periodicity of the SPS resources;

d. Time domain resources: E.g. symbol/slot index for the SPS occasion;

e. Frequency domain resources: E.g. Physical Resource Block index for the SPS grant; and f. DM-RS resource: Location of demodulation reference signal resource;

b) Some parameters can be common to all resource within one bandwidth part. For instance, one or more of following can be common for all the SPS resources of the SPS configuration within one bandwidth part:

a. SPS resource index or identity: This is an index value which is configured using RRC configuration and is unique at least for each bandwidth part within a cell;

b. Identity of bandwidth part (e.g. bandwidth part index);

c. Identity of serving cell (e.g. serving cell index);

d. SPS periodicity: Time periodicity of the SPS resources;

e. Time domain resources: E.g. symbol/slot index for SPS occasion;

f. Frequency domain resources: E.g. Physical Resource Block index for SPS grant;

g. DM-RS resource: Location of demodulation reference signal; and h. Configured grant timer: During the time the timer is on UE monitors for retransmission grants from the network; and c) If bandwidth part identity is not included within the SPS resource configuration, then in one solution SPS resource index is included within RRC container which contains configuration of bandwidth part, which associates SPS resource with the given bandwidth part. In another solution, bandwidth part specific configuration parameters of the SPS resource are provided within RRC container which contains configuration of bandwidth part.

SPS configuration can be of one of the two types:

a) Container based parameter partition: the SPS configuration contains one container for common parameters configuration and contains multiple containers (of list of containers) for bandwidth specific parameters. The container which contains bandwidth specific parameters also contains list of bandwidth part identities for which the parameter values are applicable; and b) List based parameter configuration: each bandwidth specific parameter in SPS configuration includes of a list of objects, where each object contains the parameter value and list of bandwidth part identities for which the parameter value is applicable. Common parameters contain just value of parameters.

If the UE's active bandwidth part change is triggered for a serving cell and the uplink SPS configuration is activated for the given serving cell (i.e. one of the resource of the SPS configuration is activated), then the UE performs one or more of the following procedure if the new active bandwidth part of the given serving cell contains resources for the given the SPS configuration:

a) If SPS configuration does not require activation command for the UE to initiate transmission/reception on the SPS (i.e. all radio resource allocation parameters are provided in the SPS configuration), then the UE can perform transmission/reception on the resource present in the SPS configuration which is applicable for the new active bandwidth part for the given serving cell and the UE performs autonomous deactivation of the SPS configuration for the previous bandwidth part of the given serving cell;

b) In one solution, if the SPS configuration requires activation command for the UE to initiate transmission/reception on the SPS (i.e. some of the radio resource allocation parameters are provided in activation command), then the UE performs autonomous deactivation of the SPS configuration for the previous bandwidth part of the given serving cell;

c) In another solution, if the SPS configuration requires activation command for the UE to initiate transmission/reception on the SPS (i.e. some of the radio resource allocation parameters are provided in activation command), then the UE uses the same time reference for the SPS and HARQ occasion calculation as used in previous bandwidth part where SPS was activated; and d) In another solution, the UE performs procedure mentioned in 5(c) if the new active bandwidth part has the same physical layer numerology (e.g. subcarrier spacing) as used in bandwidth part where SPS was previously activated. Otherwise UE performs procedure as mentioned in 5(b).

If the UE's active bandwidth part change is triggered for a serving cell and the SPS configuration is activated in the given serving cell (i.e. one of the resource of the SPS configuration is activated), then the UE performs one or more of the following procedure if the new active bandwidth part of the given serving cell does not contain resources for the given the SPS configuration:

a) If the SPS configuration does not require activation command for the UE to initiate transmission/reception on the SPS (i.e. all radio resource allocation parameters are provided in the SPS configuration), then the UE does not perform transmission/reception on any of the resource of the SPS configuration for the given serving cell (i.e. the SPS resource is suspended) until the UE's active bandwidth part for the given serving cell does not changes; and b) If the SPS configuration requires activation command for the UE to initiate transmission/reception on the SPS (i.e. some of the radio resource allocation parameters are provided in activation command), then the UE performs autonomous deactivation of the SPS configuration (if not deactivated before) for the previous bandwidth part of the given serving cell.

Figure 14:
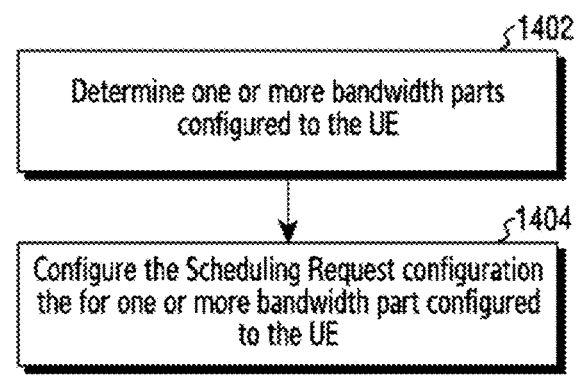
FIG. 14 illustrates a flow chart of a method for providing a scheduling request (SR) configuration to the UE in the wireless communication system according to an embodiment as disclosed herein.

FIG. 14 illustrates a flow chart of a method for providing a scheduling request configuration to the UE in the wireless communication system according to an embodiment as disclosed herein.

Referring to the FIG. 14, at step 1402, the network node 700 determines the one or more bandwidth parts configured to the UE. For example, in the network node 700 as illustrated in the FIG. 7, the BW part determination engine 710 can be configured to determine the one or more bandwidth parts configured to the UE.

At step 1404, the network node 700 configures the SR configuration the for the one or more bandwidth parts configured to the UE. For example, in the network node 700 as illustrated in the FIG. 7, the SR resources configuration engine 730 can be configured to configure the SR resources for the one or more bandwidth parts configured to the UE.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 15:
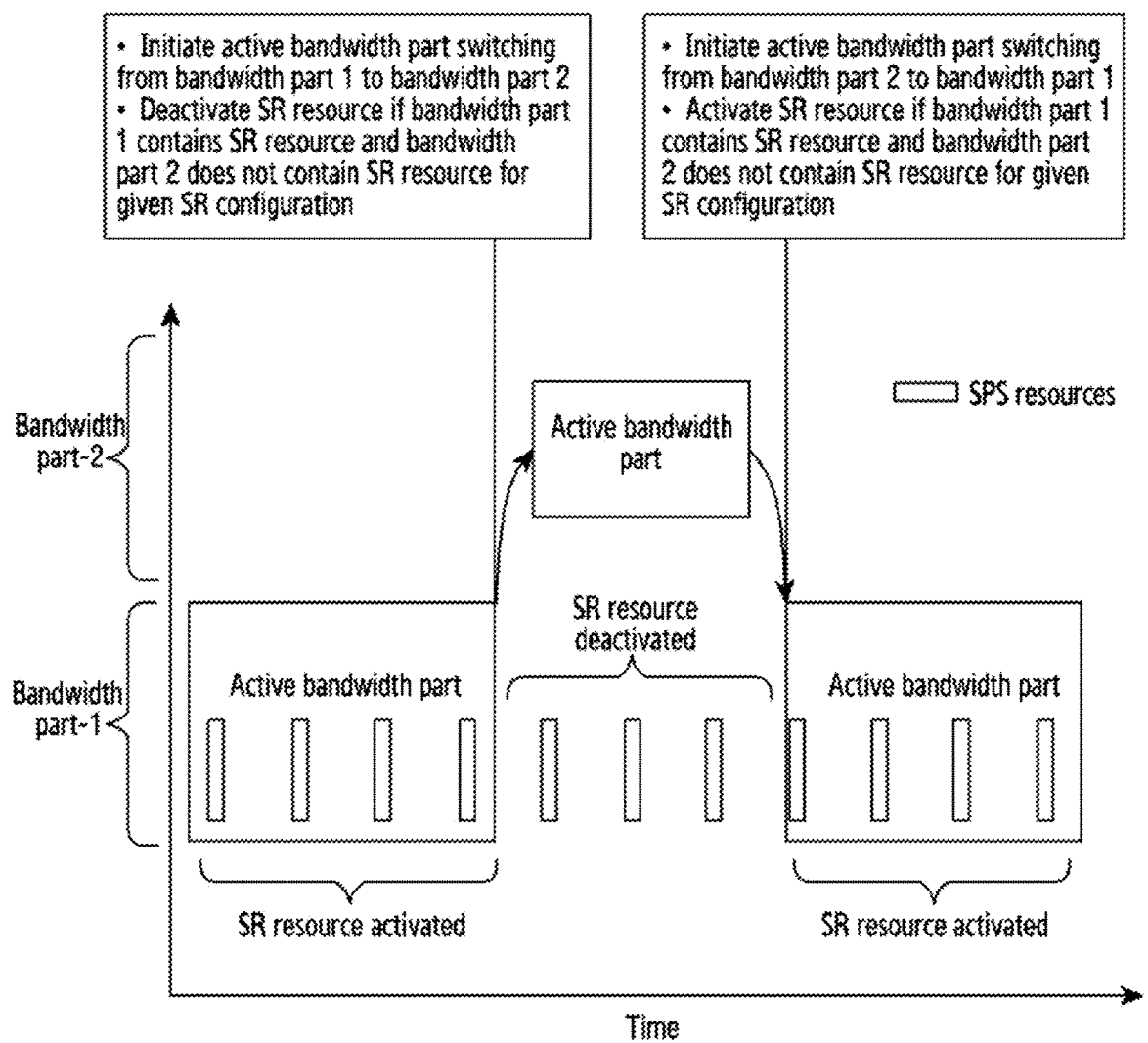
FIG. 15 illustrates a graph of an autonomous activation/deactivation of a SR resources according to embodiment as disclosed herein.

FIG. 15 illustrates a graph of the autonomous activation/deactivation of the SR resources according to an embodiment as disclosed herein.

In 5G, radio resource allocation of dynamic grants is relative to a bandwidth part. Hence, if the SR resource allocation also follows the same approach, the SR resources are invalidated if the UE changes to a different bandwidth part where the SR is not configured and the UE is not allowed to transmit in the bandwidth part where SR is configured (this can be due to UE capability to support single/multiple bandwidth parts). We assume that SR resources allocation includes information about bandwidth part where SR transmissions can be performed by the UE.

Referring now to FIG. 15, If the UE has at least one SR resource which is activated in current active bandwidth part "X" of a serving cell and UE's active bandwidth part changes/switches due to which bandwidth part "X" for the given serving cell is no longer active, the UE performs autonomous deactivation of SR resources which were previously activated in bandwidth part "X" of the given serving cell. Also, after changing/switching active bandwidth part due to which bandwidth part "X" of the given serving cell becomes active, the UE can autonomously activate SR resources which are allocated to the current active bandwidth part "X" of the given serving cell:

1. The UE can determine the bandwidth part and serving cell where the UE performs transmission of an SR resource. This can be indicated to the UE by RRC configuration of the SR;

2. If the UE is configured with the SR configuration which contains an activated SR resource in the UE's active bandwidth part "X" of a serving cell and if the UE changes the UE's bandwidth part or given serving cell is deactivated due to which bandwidth part "X" of the given serving cell is no longer active and the new active bandwidth part "Y" of the given serving cell does not contain any SR resource for the given the SR configuration, then the UE performs autonomous deactivation of SR resources present in the previous active bandwidth part "X" of the given serving cell for the given SR configuration;

3. If the UE is configured with an SR configuration which does not contain any SR resource in the UE's active bandwidth part "Y" of a serving cell and if the UE changes the UE's bandwidth part or given serving cell activates due to which bandwidth part "Y" of the given serving cell is no longer active and the new active bandwidth part "X" of the given serving cell contains the uplink SR resource for the given SR configuration, then the UE performs autonomous activation of uplink SR resources present in the new active bandwidth part "X" of the given serving cell for the given the SR configuration; and 4. The UE triggers autonomous activation/deactivation procedure when one or more of the following is true:
   a) The UE receives a Layer-1/MAC/RRC message indicating to change the UE's active bandwidth part;
   b) Expiration of a timer which triggers change of active bandwidth part of the UE; and
   c) When the UE completes the UE's switch to a new active bandwidth part.

Figure 16A:
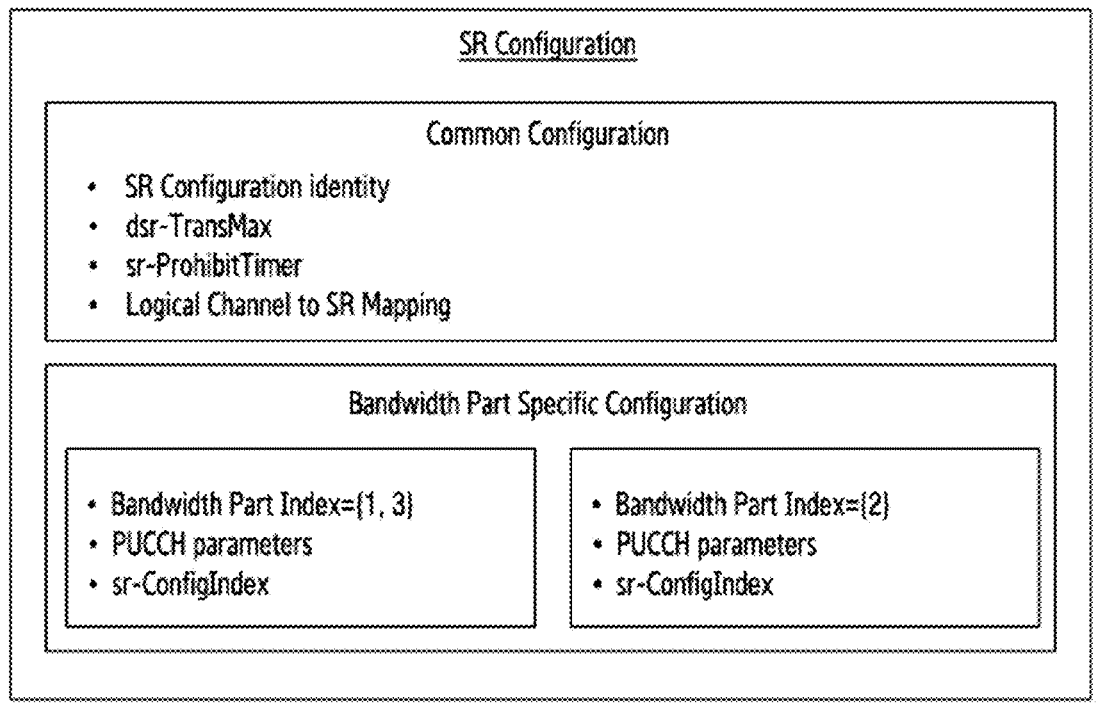
FIG. 16A illustrates a graph of the first example of the cellular network configuration of scheduling request resources for different bandwidth parts where configuration is divided into the common and the bandwidth part specific parameter containers according to the embodiment as disclosed herein.

FIG. 16A illustrates a graph of the first example of the cellular network configuration of the scheduling request resources for different bandwidth parts where configuration is divided into the common and the bandwidth part specific parameter containers according to the embodiment as disclosed herein.

FIG. 16B illustrates a graph of the second example of the cellular network configuration of the scheduling request resources for different bandwidth parts where configuration is divided into the common and the bandwidth part specific parameter containers according to the embodiment as disclosed herein.

Referring now to FIGS. 16A and 16B, the UE can be configured with multiple SR resources in different bandwidth parts (which may belong to same or different serving cells) which can be part of single SR configuration. The UE selects the SR resources for transmission based on the UE's current active bandwidth part of a serving cell.

The SR configuration of the UE comprises of common and bandwidth specific parameters. Common parameters are applicable for all bandwidth parts of the UE. Bandwidth specific parameter values are only applicable to bandwidth parts which are indicated along with the parameter value.

Parameters which are common to all bandwidth parts can be one or more of following:
  a. SR configuration identity;
  b. dsr-TransMax: Maximum SR transmissions before RACH procedure is triggered;
  c. sr-ProhibitTimer: Minimum time difference between successive SR transmissions;
  d. Logical channel mapping: Logical channels for which this SR configuration is applicable; and
  e. sr-ConfigIndex: Resource allocation of SR within PUCCH resources.

Parameters which are bandwidth specific can be one or more of following:
  a) Identity of bandwidth part (e.g. bandwidth part index);
  b) Identity of serving cell (e.g. serving cell index);
  c) SR Resource Index: Identity of a SR resource. The value is unique at least for each bandwidth part within a cell;
  d) sr-ConfigIndex: Resource allocation of SR within PUCCH resources;
  e) PUCCH parameters; and
  f) dsr-TransMax: Maximum SR transmissions before RACH procedure is triggered.

If bandwidth part identity is not included within a SR resource configuration, then in one solution the SR resource index is included within RRC container which contains configuration of bandwidth part, which associates the SR resource with the given bandwidth part. In another solution, bandwidth part specific configuration parameters of the SR resource are provided within RRC container which contains configuration of bandwidth part.

The SR configuration can be of one of the two types:
  a) Container based parameter partition: The SR configuration contains one container for common parameters configuration and contains multiple containers (of list of containers) for bandwidth specific parameters. Further, the container which contains bandwidth specific parameters also contains list of bandwidth part identities for which the parameter values are applicable; and
  b) List based parameter configuration: Each bandwidth specific parameter in the SR configuration comprises of a list of objects, where each object contains the parameter value and list of bandwidth part identities for which the parameter value is applicable. Common parameters contain just value of parameters.

If the UE's active bandwidth part change is triggered for a serving cell and an uplink SR configuration is activated for the given serving cell (i.e. one of the resource of the SR configuration is activated) and if the new active bandwidth part "X" of the given serving cell contains resources for SR configuration, then the UE can perform transmission on the resource present in the SR configuration which is applicable for the new active bandwidth part "X" of the given serving cell. The UE does not update or reset any counter or timer associated with the common parameters of the SR configuration.

If the UE's active bandwidth part change is triggered for a serving cell and an SR configuration is activated for the given serving cell (i.e. one of the resource of SR configuration is activated) if none of the new active bandwidth parts of the given serving cell contain resources for SR configuration, then the UE does not perform transmission/reception on any of the resource of the SPS configuration of the given serving cell until the UE's active bandwidth part changes for the given serving cell.

Figure 17A:
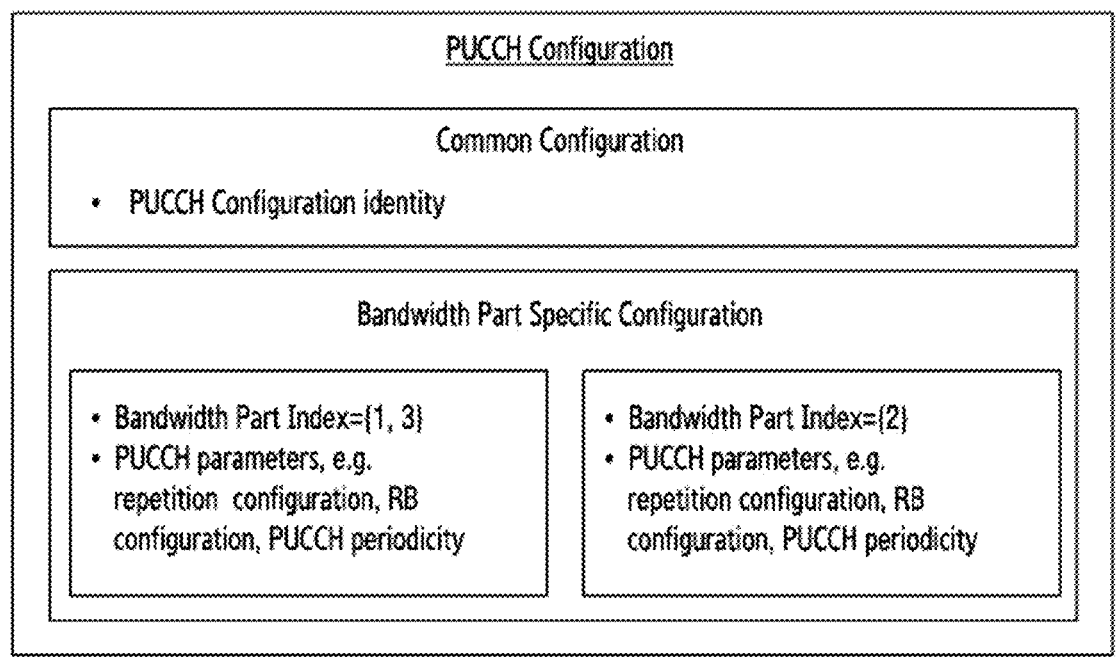
FIG. 17A illustrates a graph of the first example of the cellular network configuration of a physical uplink control channel (PUCCH) resources for different bandwidth parts where configuration is divided into the common and the bandwidth part specific parameter containers according to the embodiment as disclosed herein.

FIG. 17A illustrates a graph of the first example of the cellular network configuration of physical uplink control channel (PUCCH) resources for different bandwidth parts where configuration is divided into common and bandwidth part specific parameter containers according to the embodiment as disclosed herein.

FIG. 17B illustrates a graph of the second example of the cellular network configuration of physical uplink control channel (PUCCH) resources for different bandwidth parts where configuration is divided into common and bandwidth part specific parameter containers according to the embodiment as disclosed herein.

Referring now to FIG. 17A and 17B, the UE can be configured with multiple PUCCH resources in different bandwidth parts (which may belong to same or different serving cells) which can be part of single PUCCH configuration. The UE selects PUCCH resources for transmission based on the UE's current active bandwidth part of a serving cell.

PUCCH configuration of the UE comprises of common and bandwidth specific parameters. Common parameters are applicable for all bandwidth parts of the UE. Bandwidth specific parameter values are only applicable to bandwidth parts which are indicated along with the parameter value.

Parameters which are common to all bandwidth parts can be one or more of following:

a. PUCCH configuration identity; and b. Parameters which are bandwidth specific can be one or more of following:

Identity of the bandwidth part (e.g. bandwidth part index), identity of the serving cell (e.g. serving cell index), PUCCH resource index which uniquely identifies a PUCCH resource for each bandwidth part of a cell, PUCCH resource allocation parameters, e.g. repetition configuration, resource block configuration, PUCCH period, etc. If bandwidth part identity is not included within a PUCCH resource configuration, then in one solution PUCCH resource index is included within RRC container which contains configuration of bandwidth part, which associates PUCCH resource with the given bandwidth part. In another solution, bandwidth part specific configuration parameters of PUCCH resource are provided within RRC container which contains configuration of bandwidth part.PUCCH configuration can be of one of the two types:

a) Container based parameter partition: The PUCCH configuration contains one container for common parameters configuration and contains multiple containers (of list of containers) for the bandwidth specific parameters. The container which contains bandwidth specific parameters also contains list of bandwidth part identities for which the parameter values are applicable; and b) List based parameter configuration: each bandwidth specific parameter in the PUCCH configuration comprises of a list of objects, where each object contains the parameter value and list of bandwidth part identities for which the parameter value is applicable. Common parameters contain just value of parameters.

If the UE's active bandwidth part change is triggered for a serving cell and an uplink PUCCH configuration is activated in the given serving cell (i.e. one of the resource of PUCCH configuration is activated) and if the new active bandwidth part "X" of the given serving cell contains resources for PUCCH configuration, then the UE can perform transmission on the resource present in the PUCCH configuration which is applicable for the new active bandwidth part "X" of the given serving cell.

If the UE's active bandwidth part change is triggered for a serving cell and an PUCCH configuration is activated in the given serving cell (i.e. one of the resource of PUCCH configuration is activated) if none of the new active bandwidth parts of the given serving cell contain resources for PUCCH configuration, then the UE does not perform transmission/reception on any of the resource of the PUCCH configuration of the given serving cell until the UE's active bandwidth part changes for the given serving cell.

Figure 18:
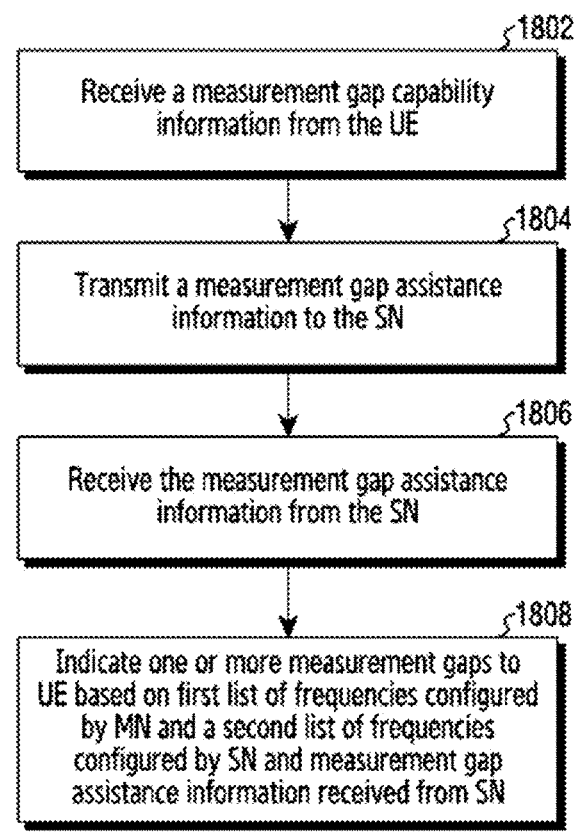
FIG. 18 illustrates a flow chart of a method for providing a measurement gap to the UE in the wireless communication system according to an embodiment as disclosed herein.

FIG. 18 illustrates a flow chart of a method for providing a measurement gap to the UE in the wireless communication system according to an embodiment as disclosed herein.

Referring to the FIG. 18, at step 1802, the network node 700 receives the measurement gap capability information from the UE. For example, in the network node 700 as illustrated in the FIG. 7, the communicator 750 can be configured to receive the measurement gap capability information from the UE.

At step 1804, the network node 700 transmits the measurement gap assistance information to the SN. For example, in the network node 700 as illustrated in the FIG. 7, the communicator 750 can be configured to transmit the measurement gap assistance information to the SN.

At step 1806, the network node 700 receives the measurement gap assistance information from the SN. For example, in the network node 700 as illustrated in the FIG. 7, the communicator 750 can be configured to receive the measurement gap assistance information from the SN.

At step 1808, the network node 700 indicates the one or more measurement gaps to the UE based on a first list of frequencies configured by the MN and a second list of frequencies configured by the SN and the measurement gap assistance information received from the SN. For example, in the network node 700 as illustrated in the FIG. 7, the communicator 750 can be configured to indicate the one or more measurement gaps to the UE based on the first list of frequencies configured by the MN and the second list of frequencies configured by the SN and the measurement gap assistance information received from SN.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 19:
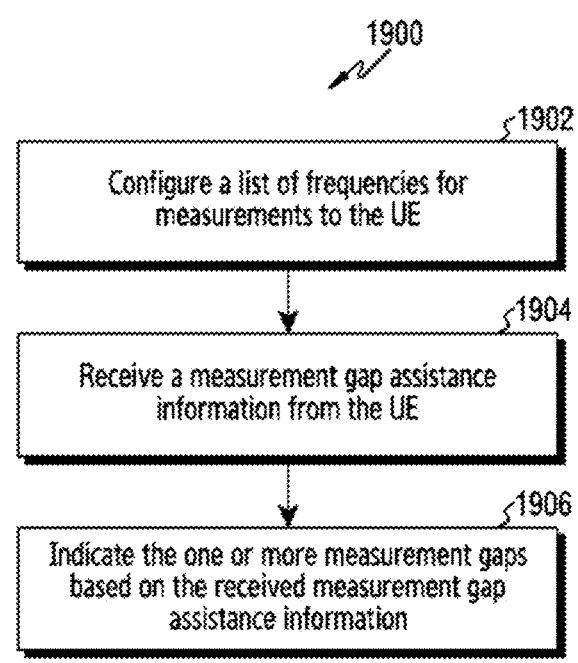
FIG. 19 illustrates a flow chart of another method for providing the measurement gap to the UE in the wireless communication network according to an embodiment as disclosed herein.

FIG. 19 illustrates a flow chart 1200 of another method for providing the measurement gap to the UE in the wireless communication network according to an embodiment as disclosed herein.

Referring to the FIG. 19, at step 1902, the network node 700 configures a list of frequencies for measurements to the UE. For example, in the network node 700 as illustrated in the FIG. 7, the measurement gap management engine 740 can be configured to configure the list of frequencies for measurements to the UE.

At step 1904, the network node 700 receives measurement gap assistance information from the UE. For example, in the network node 700 as illustrated in the FIG. 7, the communicator 750 can be configured to receive the measurement gap assistance information from the UE.

At step 1906, the network node 700 indicates the one or more measurement gaps based on the received measurement gap assistance information. For example, in the network node 700 as illustrated in the FIG. 7, the communicator 750 can be configured to indicate the one or more measurement gaps based on the received measurement gap assistance information.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 20:
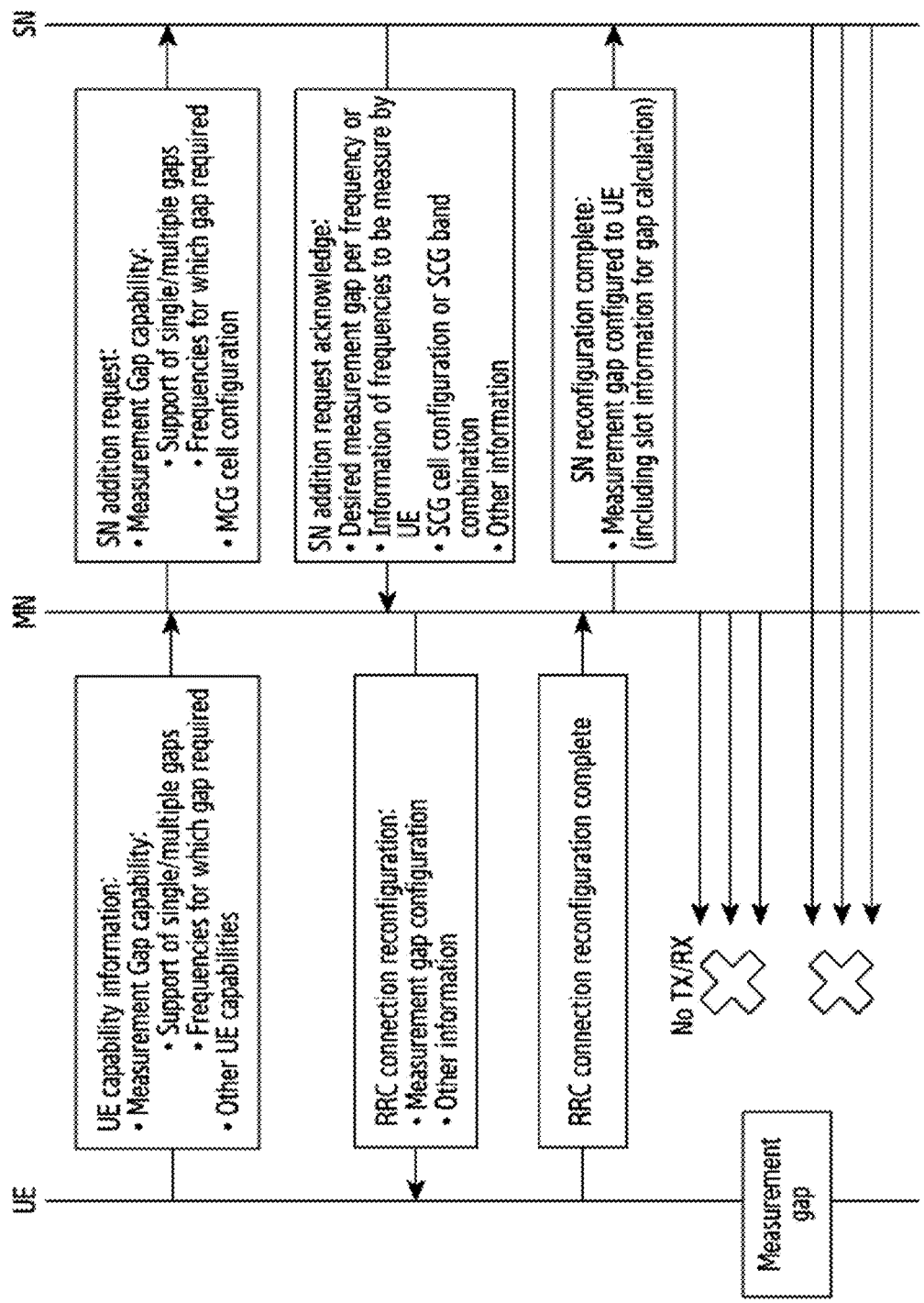
FIG. 20 illustrates a sequence diagram of a sub-Solution-1 of the measurement gap configured by a master node (MN) according to embodiment as disclosed herein.

FIG. 20 illustrates a sequence diagram of the sub-Solution-1 of the measurement gap configured by the MN according to an embodiment as disclosed herein. The UE is configured with one or multiple measurement gap(s) by the master node (MN). The UE uses the measurement gap(s) configured by the MN to perform measurement according to measurement configuration provided by both the MN and the SN.

The UE provides information to the MN about the UE's capability to support measurement gaps based on the RF chains used by the UE to perform measurements of different frequencies. This information can be part of the UE Capability Information message transmitted by the UE to the MN during capability transfer or RRC connection reconfiguration complete message transmitted by the UE to the MN or RRC connection complete message transmitted by the UE to network. One or more of following information is provided by the UE in the capability transfer message:

a. The UE provides information about number of measurement gaps supported by the UE. If the UE is capable of supporting more than one measurement gap then for each measurement gap, the UE also provides information about the frequency range for which the measurement gap is applicable. In one solution, this information can be provided by defining independent information elements (IE) for each frequency range and the UE includes the relevant IEs in the capability transfer message. In another solution, this information is provided by the UE by indicating the frequency range information associated with each measurement gap (e.g. can be in form of ARFCN range); and b. For each carrier aggregation cell/band combination, the UE indicates for which frequencies (same RAT or different RAT) the UE requires measurement gap. The information is indicated in form of a list of frequencies for each carrier aggregation cell/band combination, where each entry in the list indicates whether measurement gap is required for the associated frequency. Multiple lists can be included per carrier aggregation cell/band combination, where each list contains entries for frequencies belonging to a specific frequency range and RAT type. For example, following IE can be used, where "UE-Capability" can refer to Multi-RAT Dual Connectivity (MR-DC) the UE capability (which is shared between multiple RATs) and/or 5G UE capability, and "MeasParameters" contains "bandCombinationList" is a list where each entry ("BandInfo") is associated to a band combination that the UE can support for MR-DC or 5G carrier aggregation. Within each "BandInfo" multiple objects or list of entries can be present, where each object/entry is associated with a frequency range and a RAT (in the example "interFreqBandListFR1" is associated to FR1 frequency range of 5G and "interFreqBandListFR2" is associated to FR2 frequency range of 5G), note that the object/entry can be in form of a separate information element (IE) or can be part of a list. Each such object/entry further includes list of frequency bands that the UE can support (indicated by "InterFreqBandInfo" in the example is associated to a specific frequency band)) where each such entry at least contains a variable "interFreqNeedForGaps" indicating whether the UE requires a measurement gap for the frequency band or not. Absence of list of frequencies corresponding to a frequency range (e.g. "interFreqBandListFR2") indicates that the UE does not require measurement gap to measure any frequency belonging to the given frequency range.

The MN forwards the information about the UE's measurement gap capability to the SN using either SN addition request message or the SN reconfiguration complete message or the SN modification required message or any other message passed from the MN to the SN.

The MN provides information about cell configuration/band combination used for the master cell group (MCG) which includes information on band combination used in MCG, frequency carrier identity where a given MCG cell is operating (e.g. ARFCN), cell index value used by the MN, global cell identity, physical cell identity, etc. This information can be passed from MN using either SN addition request message or SN reconfiguration complete message or SN modification required message or any other message passed from MN to SN. The MN provides the cell configuration/band combination to SN at least for the instances when UE is reconfigured with a new cell configuration by MN. Based on cell configuration/band combination provided by MN and frequencies configured for measurements to UE, SN can calculate the frequencies for which measurement gap is required.

The SN provides information to the MN about the UE's measurement requirements in SN addition request acknowledge or SN modification required or any other message which is transmitted from SN to MN. One or more of following information is provided by SN to MN:

c. List of frequency carriers which are configured by the SN to the UE for measurements. The information can be provided in form of a single list or can be provided in form of multiple lists, where each list is associated to a specific frequency range (e.g. FR1 or FR2) and RAT type, and all the frequency carriers included are part of the given frequency range and RAT type. SN may only indicate subset of frequency carriers configured by SN to the UE, which belong to the frequency ranges for which MN is required to configure measurement gap to UE. For e.g. if MN configures measurement gap(s) for both FR1 and FR2 frequency ranges (i.e. when UE is operating in 5G DC or when UE supports single measurement gap in case of MR-DC), then SN includes all frequencies which are configured to be measured by UE belonging to FR1 or FR2, however if MN configures measurement gap(s) only for FR1 frequency ranges (i.e. when UE supports multiple measurement gaps when operating in MR-DC), then SN includes all frequencies which are configured to be measured by the UE belonging to FR1 only;

d. Cell configuration/band combination of the secondary cell group which includes information on band combination used in SCG, frequency carrier identity where a given cell is operating, cell index value configured by the SN, global cell identity, physical cell identity, etc. the SN provides the cell configuration/band combination to the MN at least for the instances when the UE is reconfigured with a new cell configuration by the SN. Based on cell configuration/band combination provided by the SN and frequencies configured for measurements to the UE, the MN can calculate the frequencies for which measurement gap is required;

e. SS burst set occasions (time offset and periodicity) and/or CSI-RS measurement configuration (e.g. CSI-RS transmission occasions, time offset and periodicity) for each frequency carrier configured by the SN to the UE for measurements. SN may only indicate the information for a subset of frequency carriers configured by the SN to the UE, which belong to the frequency ranges for which MN is required to configure measurement gap to the UE. For e.g. if the MN configures measurement gap(s) for both FR1 and FR2 frequency ranges (i.e. when the UE is operating in 5G DC or when the UE supports single measurement gap in case of MR-DC), then SN includes information for all frequencies which are configured to be measured by the UE belonging to FR1 or FR2, however if MN configures measurement gap(s) only for FR1 frequency ranges (i.e. when the UE supports multiple measurement gaps when operating in MR-DC), then SN includes information for all frequencies which are configured to be measured by the UE belonging to FR1 only; and f. Desired measurement gap pattern (measurement gap time offset, measurement gap periodicity, measurement gap length, measurement gap type and slot length used for measurement gap computation time e.g. duration of a slot/ numerology used/subcarrier spacing used/number of slots in a system frame) for each frequency carrier or frequency range to be configured by the SN. The SN may only indicate the information for a subset of frequency carriers configured by the SN to the UE, which belong to the frequency ranges for which the MN is required to configure measurement gap to the UE. For e.g. if the MN configures measurement gap(s) for both FR1 and FR2 frequency ranges (i.e. when the UE is operating in 5G DC or when the UE supports single measurement gap in case of MR-DC), then the SN includes information for all frequencies which are configured to be measured by the UE belonging to FR1 or FR2, however if the MN configures measurement gap(s) only for FR1 frequency ranges (i.e. when UE supports multiple measurement gaps when operating in MR-DC), then SN includes information for all frequencies which are configured to be measured by the UE belonging to FR1 only.

Figure 21:
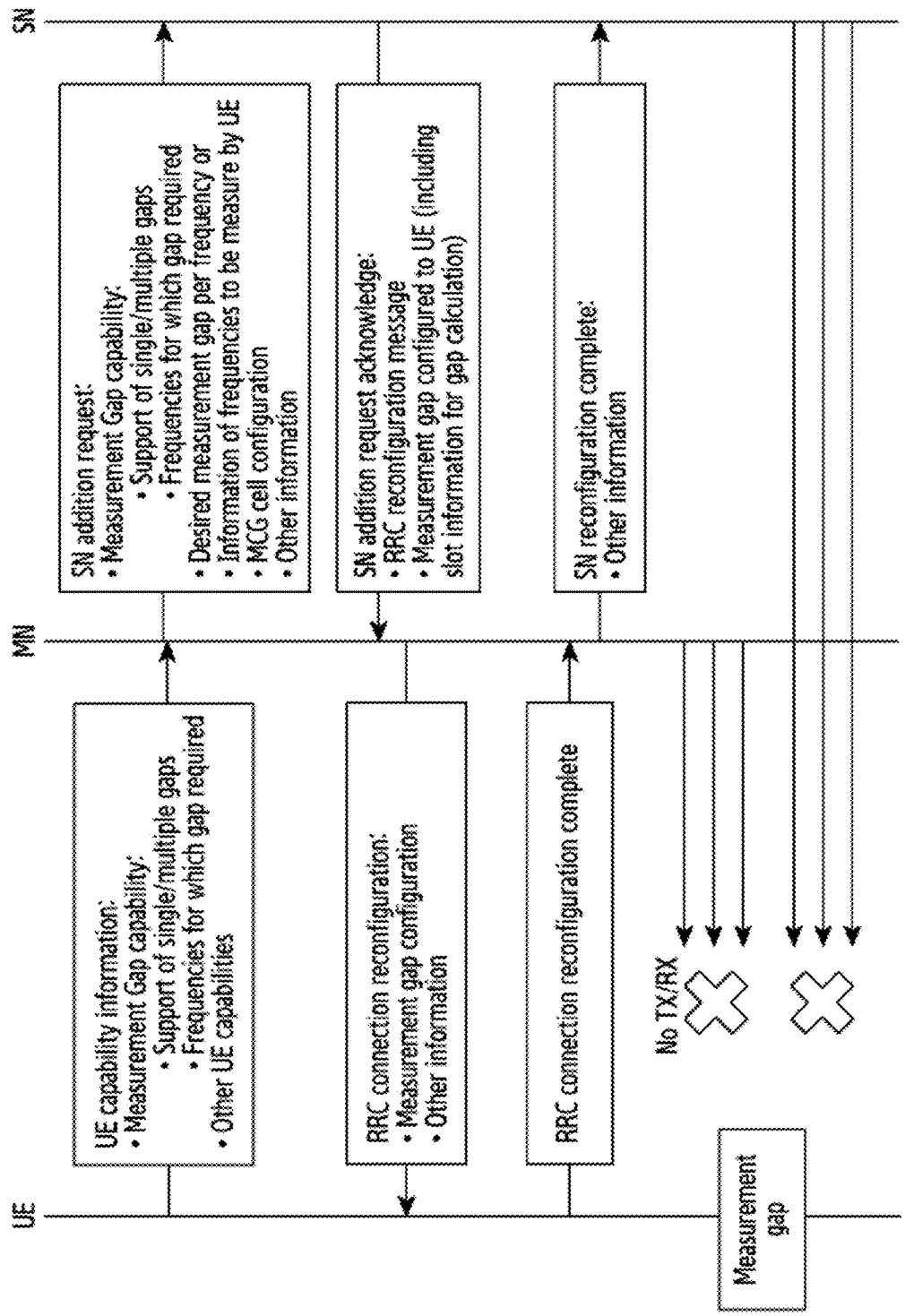
FIG. 21 illustrates a sequence diagram of a sub-solution-2 of the measurement gap configured by the MN according to embodiment as disclosed herein.

FIG. 21 illustrates a sequence diagram of a sub-solution-2 of Measurement Gap Configured by the MN according to the embodiment as disclosed herein. The UE can be configured with multiple measurement gap(s) by the MN. The UE provides assistance information to cellular network for measurement gap configuration. The UE uses the measurement gap(s) configured by the MN to perform measurement according to measurement configuration provided by both the MN and the SN.

In capability transfer message, the UE indicates the UE's capability of supporting measurement gap per cell group and/or measurement gap per serving cell and/or single measurement gap. The information is transmitted to the MN using the capability transfer message and MN subsequently forwards the information to the SN using either the SN addition request message or the SN reconfiguration complete message or the SN modification required message or any other message passed from vMN to the SN. If the UE is capable of supporting more than one measurement gap then for each measurement gap, the UE also provides information about the frequency range for which the measurement gap is applicable, i.e. group of cells is determined by the range of frequency over which the cells are operating.

In one solution, this information can be provided by defining independent information elements (IE) for each frequency range and the UE includes the relevant IEs in the capability transfer message. In another solution, this information is provided by the UE by indicating the frequency range information associated with each measurement gap (e.g. can be in form of ARFCN range).

The MN and the SN configure independent measurements to the UE using RRC connection reconfiguration message. RRC connection reconfiguration message also includes the parameter(s) which indicates if the UE may include perCC-GapIndicationList or perCG-GapIndicationList within RRC connection reconfiguration complete message. Following information is provided for each frequency to be measured by the UE: SS burst set occasions (time offset and time periodicity) for each frequency. For MN configured frequencies, time offset for SS burst set occasions is relative to SFN=0 of PCell. For the SN configured frequencies, in one solution, time offset for SS burst set occasions is relative to SFN=0 of PSCell. In another solution, time offset for SS burst set occasions for SN configured frequencies is relative to SFN=0 of PCell.

Based on the configured measurements, a UE determines which RF chains are used to perform measurements of which frequency carrier. Also, based on serving cells which are configured by the MN and the SN, the UE determines which RF chains are used for communication with which serving cells. Using the above information, the UE determines the measurement gap required for each serving cell in order to measure the frequencies configured by the MN and/or the SN. the UE determines whether the UE is required to indicate the UE's measurement gap requirement to MN if one or more of the following criteria are met:

a. If the UE receives MN RRC connection reconfiguration message which contains a parameter "gapIndicationListRequired;"

b. If the UE determines that at least one of the frequency measurement requirement cannot be satisfied or cannot be measured by the current configured measurement gap to the UE by MN. The UE determines that gap is configured by the MN if (i) the UE supports single measurement gap or (ii) the UE supports multiple measurement gaps and the UE is operating in Multi-RAT DC and at least one of the frequencies for which measurement gap requirement is not satisfied belongs to a frequency range for which the MN is responsible to configure measurement gap (e.g. FR1) or (iii) UE is operating in 5G dual connectivity. Measurement requirement can be in terms of number of measurements the UE can perform for a frequency within a certain duration of time;

c. If the UE determines that at least one of the frequency measurement requirement cannot be satisfied or cannot be measured by any of the current configured measurement gap to the UE. Measurement requirement can be in terms of number of measurements the UE can perform for a frequency within a certain duration of time; and d. If the UE has received the RRC reconfiguration message from the MN and due to which the UE determines that at least one of the frequency measurement requirement cannot be satisfied or cannot be measured by any of the current configured measurement gap to the UE. Measurement requirement can be in terms of number of measurements the UE can perform for a frequency within certain duration of time.

If the UE receives MN RRC connection reconfiguration message in response for which the UE determines based on (3) that the UE needs to indicate the UE's measurement gap requirement to network, then the UE performs transmission of the UE's measurement gap requirement (according to 6) to the MN using the "RRC connection reconfiguration complete" message or any other RRC message sent from UE to MN using MCG.

If the UE receives SN RRC connection reconfiguration message in response for which the UE determines based on (3) that the UE needs to indicate the UE's measurement gap requirement to network, one or more of following procedure is used to indicate measurement gap requirement by the UE to network:

e. In one solution, if SN RRC connection reconfiguration message containing measurement configuration is encapsulated within MN RRC connection reconfiguration message, then UE provides the UE's measurement gap requirement (according to 6) using "RRC connection reconfiguration complete" message sent to MN;

f. In another solution:
  i. If measurement gap indication timer is configured to the UE, then the UE (re)starts measurement gap indication timer;
  ii. During the time measurement gap indication timer is running if the UE is required to transmit the SN RRC connection reconfiguration complete, then the UE provides the UE's measurement gap requirement using "RRC connection reconfiguration complete" message sent to the SN; and
  iii. If measurement gap indication timer expires or if measurement gap indication timer is not configured to the UE, the UE provides the UE's measurement gap requirement using "RRC measurement gap indication" message or dynamic capability indication sent to the MN. Note that these RRC messages are the UE initiated and at least contains the UE's measurement gap requirements as provided in 6;

g. In another solution, the UE provides the UE's measurement gap requirement (according to 6) using the first "RRC connection reconfiguration complete" message which needs to be sent to the MN after reception of the SN RRC connection reconfiguration message; and h. In another solution, the UE provides the UE's measurement gap requirement (according to 6) using "RRC connection reconfiguration complete" message sent to the SN;
  i. In one solution, the measurement gap requirement content is encapsulated within a container which is encoded using RRC format used by the MN. The SN after receiving the container, transparently (without any modifications) forwards container to the MN using the SN addition request acknowledge or the SN modification required or any other message which is transmitted from the SN to the MN; and
  ii. In another solution, the measurement gap requirement is encoded using RRC format used by the SN. The SN forwards the information to the MN using the SN addition request acknowledge or the SN modification required or any other message which is transmitted from the SN to the MN. The information is forwarded by the SN using an RRC container and can be the same contents and RRC IE as used by the UE to indicate the UE's measurement gap requirement (according to 6).

When the UE provides information about the UE's measurement gap requirement, following information is included:
  i. Measurement configuration provided by the MN and the SN: (i) Frequency carriers configured by the MN and the SN for measurements including RAT indication, (ii) SS burst set occasions and/or CSI-RS occasions for each frequency carrier configured by the MN and the SN for measurements. The UE may only include information about SN measurement configuration if the SN measurement includes the contents within an MN RRC message or MN RRC container;

j. Measurement gap requirement per configured cell:
  i. Serving cell(s) index for which measurement gap to be applied and whether the serving cell belongs to MCG or SCG; and
  ii. The UE includes desired measurement gap pattern, which includes information on measurement gap time offset, measurement gap time periodicity, measurement gap length, measurement gap type and slot length used for measurement gap computation time e.g. duration of a slot/numerology used/subcarrier spacing used/number of slots in a system frame). Following information is included:
    1. Desired measurement gap time offset. The measurement gap time offset can be a time variable value, in which case the UE provides information of time varying pattern of measurement gap offset. Note that desired measurement gap time offset value can implicitly indicate values of desired measurement gap time periodicity and/or measurement gap length and/or measurement gap type;
    Desired measurement gap time periodicity;
    Desired measurement gap length; and
    Desired measurement gap type. One measurement gap type value can point to a measurement gap pattern which can be configured by cellular network. Different types of measurement gap patterns are pre-defined to the UE and the UE can indicate the desired measurement gap pattern using given information. The desired measurement gap type value can implicitly indicate values of desired measurement gap time periodicity and/or measurement gap length; and k. Measurement gap requirement per frequency carrier:
  i. List of frequency carriers for which measurement gap is required. Each entry in the list may include frequency carrier identifier (e.g. ARFCN) and RAT type of the frequency carrier;
  ii. UE includes desired measurement gap pattern, for each frequency carrier for which measurement gap is required. This includes information on measurement gap time offset, measurement gap time periodicity, measurement gap length, measurement gap type and slot length used for measurement gap computation time e.g. duration of a slot/numerology used/subcarrier spacing used/number of slots in a system frame). Following information is included:
    Desired measurement gap time offset. The measurement gap time offset can be a time variable value, in which case the UE provides information of time varying pattern of measurement gap offset. The desired measurement gap time offset value can implicitly indicate values of desired measurement gap time periodicity and/or measurement gap length and/or measurement gap type;
    Desired measurement gap time periodicity;
    Desired measurement gap length;
    Desired measurement gap type: One measurement gap type value can point to a measurement gap pattern which can be configured by cellular network. Different types of measurement gap patterns are pre-defined to the UE and the UE can indicate the desired measurement gap pattern using given information. The desired measurement gap type value can implicitly indicate values of desired measurement gap time periodicity and/or measurement gap length; and
    Desired Measurement Gap Pattern; and
  iii. The UE includes desired measurement gap pattern, which includes information on measurement gap time offset, measurement gap time periodicity, measurement gap length, measurement gap type and slot length used for measurement gap computation time e.g. duration of a slot/numerology used/subcarrier spacing used/number of slots in a system frame. The UE can include multiple measurement gap patterns where each measurement gap may indicate the frequency range over which the measurement gap needs to be applied. Following information is included:

Desired measurement gap time offset. The measurement gap time offset can be a time variable value, in which case the UE provides information of time varying pattern of measurement gap offset. Note that desired measurement gap time offset value can implicitly indicate values of desired measurement gap time periodicity and/or measurement gap length and/or measurement gap type. If desired measurement gap information is for an SCG cell:

1. Desired measurement gap time periodicity;
2. Desired measurement gap length; and
3. Desired measurement gap type. One measurement gap type value can point to a measurement gap pattern which can be configured by cellular network. Different types of measurement gap patterns are pre-defined to the UE and the UE can indicate the desired measurement gap pattern using given information. Note that desired measurement gap type value can implicitly indicate values of desired measurement gap time periodicity and/or measurement gap length.

If the MN configures single measurement gap to the UE to measure both MN and SN configured measurement frequencies or if the UE supports single measurement gap by capability, then a. The MN provides measurement gap configuration to the UE. The UE after receiving measurement gap configuration, applies the measurement gap to measure frequencies configured by the MN and the SN. The UE assumes that during measurement gap, SCG and MCG transmissions are stopped. If the MN is an LTE node, the first subframe of each gap occurs at an System Frame Number (SFN) and subframe of primary cell (PCell) of MCG meeting the condition: (a) SFN mod T=FLOOR(gapOffset/10); (b) subframe= gapOffset mod 10, where T is measurement gap repetition period in number of frames and gapOffset is indicated in measurement gap configuration. If MN is a 5G node, the first slot of each gap occurs at an system frame number (SFN) and slot meeting the condition: (a) SFN mod T=FLOOR(gapOffset/NumSlots); (b) slot=gapOffset mod NumSlots, where NumSlots is number of slots within one system frame and slot and SFN are referenced with respect to the cell which has maximum value of slot duration among all the MCG and SCG cells; and b. The MN forwards the information to the SN about the configured measurement gap and slot length (e.g. time duration of a slot/numerology used/subcarrier spacing used/number of slots in a system frame) used to calculate the measurement gap, in either the SN reconfiguration complete or the SN modification required message or the SN modification confirm or any acknowledge message to the SN in response to the SN message which provides the measurement gap requirement. The SN stops any SCG transmissions during measurement gap indicated by the MN.

If the MN can configure multiple measurement gaps to the UE:

a. The MN provides measurement gap configuration to the UE. Each measurement gap also includes cell id information for which measurement gap needs to be applied (i.e. measurement gap is applied per cell group). Cell id information can be in form of cell index value and/or physical cell identity and/or frequency carrier identity and/or frequency range identifier. When information is provided in form of frequency range identifier, then the UE determines the cells for which the measurement gap needs to be applied by finding the cells which are operating in frequencies (e.g. frequency location of SS burst set or frequency location of CSI-RS) belonging to the given frequency range. For each measurement gap, the UE determines the frequencies which need to be measured by the RF chain associated with the cell for which measurement gap is provided; and b. Measurement gap configuration contains following information if measurement gap per cell group is included:

i. Release: Command to release measurement gap configuration provided by the MN. When the UE is operating in Multi-RAT Dual Connectivity (MR-DC), then the UE does not releases any measurement gap configuration provided by the SN if release command is received; and ii. setup: Contains following information:

1. measGapConfigToRemoveList: List of objects, where each object contains: Cell group identifier indicating, for which cells, the measurement gap needs to be applied. The cell group is defined per frequency range, e.g. if information is for frequency range FR1 then the UE only applies measurement gap to the cells which are operating in FR1; and measGapConfigToAddModList: List of objects, where each object contains: Measurement Gap Pattern to be applied and Cell group identifier indicating, for which cells, the measurement gap needs to be applied. The cell group is defined per frequency range, e.g. if information is for frequency range FR1 then the UE only applies measurement gap to the cells which are operating in FR1;

c. If measurement gap configuration is corresponding to measurements gaps per cell group and setup container is included:

i. Release any measurement gap configuration if configuration does not correspond to measurement gap per cell group;

ii. In one solution, if measGapConfigToRemoveList is included: For each entry included in the measGapConfigToRemoveList, release measurement gap associated with cell group indicated in the entry;

iii. In another solution, if measGapConfigToRemoveList is not supported, the UE releases all measurement gap configuration provided by MN;

iv. If measGapConfigToAddModList in included: For each entry included in the measGapConfigToAddModList, apply or (re)configure measurement gap for the cell group indicated in the entry. To compute measurement gap, the first slot of each gap occurs at an System Frame Number (SFN) and slot meeting the condition: (a) SFN mod T=FLOOR (gapOffset/NumSlots); (b) slot=gapOffset mod NumSlots, where T is the measurement gap repetition periodicity in terms of number of system frames, value of gapOffset is provided within measurement gap configuration, NumSlots is number of slots within one system frame. Here, slot and SFN are referenced with respect to the cell which has maximum value of slot duration among all the MCG and SCG cells which belong to the indicated cell group; and d. The MN forwards information to SN about measurement gap configured to the UE during which the SN is required to stop any SCG transmissions and receptions for the UE and slot length (e.g. time duration of a slot/numerology used/subcarrier spacing used/number of slots in a system frame) used for computation of each measurement gap. The information can be included within SCG-ConfigInfo RRC container which can be included within any message passed from the MN to the SN e.g. the SN reconfiguration complete or the SN modification required message or SN modification confirm. The SN determines the SCG serving cells associated with a measurement gap by identifying the cells which are operating within the frequency range indicated in the measurement gap. The SN stops any SCG transmissions of the serving cell associated with measurement gap indicated by the MN.

Figure 22:
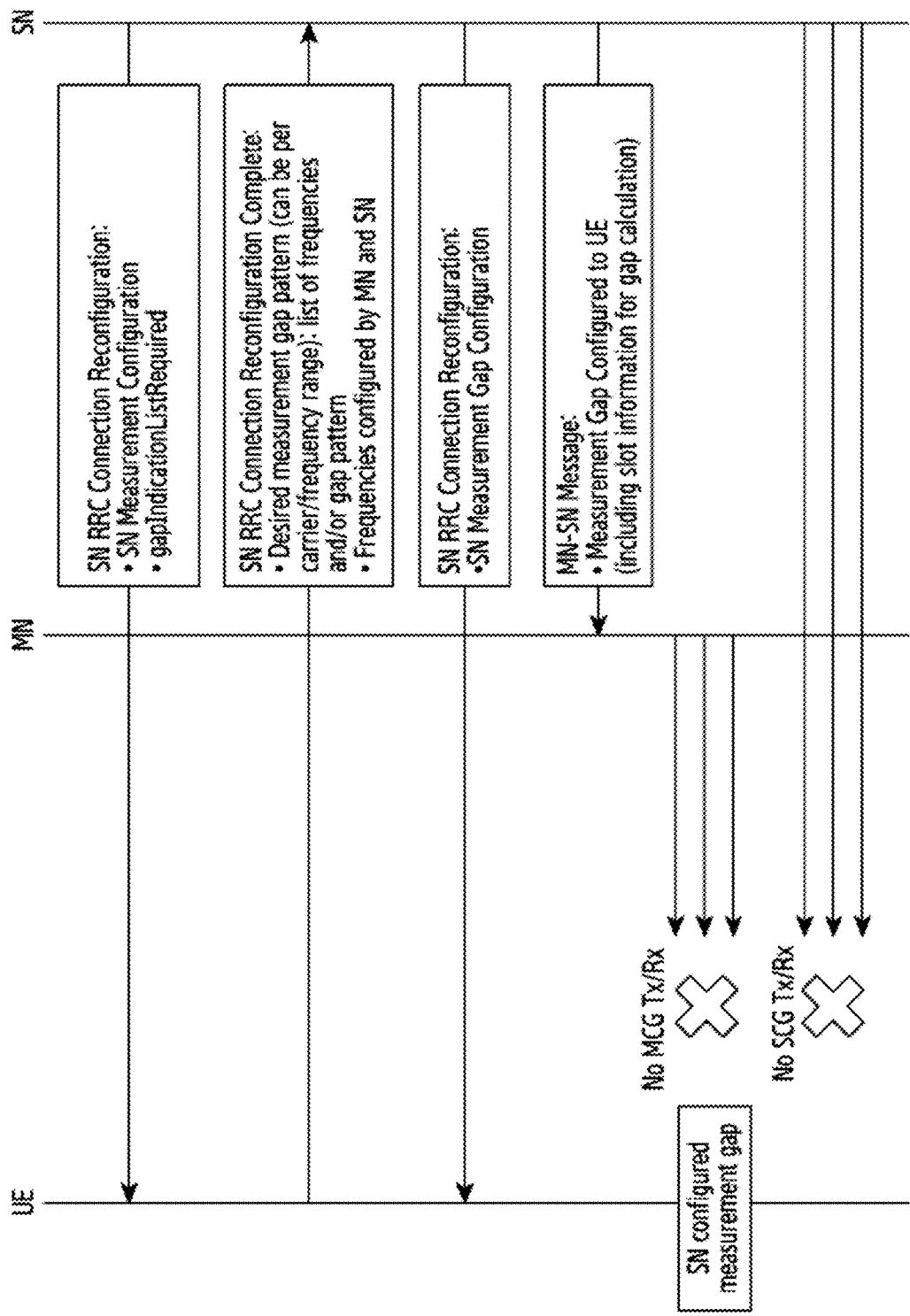
FIG. 22 illustrates a sequence diagram of a sub-solution-1 of the measurement gap configured by a secondary node (SN) according to embodiment as disclosed herein.

FIG. 22 illustrates a sequence diagram of a sub-solution-1 of measurement gap configured by the SN according to the embodiment as disclosed herein. The UE is configured with one or multiple measurement gap(s) by secondary node (MN). The UE uses the measurement gap(s) configured by the SN to perform measurement according to measurement configuration provided by both the MN and the SN.

The UE provides information to the MN about the UE's capability to support measurement gaps based on the RF chains used by the UE to perform measurements of different. The information can be part of the UE Capability Information message transmitted by the UE to the MN during capability transfer or RRC connection reconfiguration complete message transmitted by the UE to the MN or RRC connection complete message transmitted by the UE to network. One or more of following information is provided by the UE in the capability transfer message:

a. The UE provides information about number of measurement gaps supported by the the UE. If the UE is capable of supporting more than one measurement gap then for each measurement gap, the UE also provides information about the frequency range for which the measurement gap is applicable. In one solution, this information can be provided by defining independent information elements (IE) for each frequency range and the UE includes the relevant IEs in the capability transfer message. In another solution, this information is provided by the UE by indicating the frequency range information associated with each measurement gap (e.g. can be in form of ARFCN range); and b. For each carrier aggregation cell/band combination, the UE indicates for which frequencies the UE requires measurement gap. The information is indicated in form of a list of frequencies for each carrier aggregation cell/band combination, where each entry in the list indicates whether measurement gap is required for the associated frequency. Multiple lists can be included per carrier aggregation cell/band combination, where each list contains entries for frequencies belonging to a specific frequency range and RAT type. For example, following IE can be used as depicted in FIG. 16, where "UE-Capability" can refer to Multi-RAT Dual Connectivity (MR-DC) UE capability (which is shared between multiple RATs) and/or 5G UE capability, and "MeasParameters" contains "bandCombinationList" is a list where each entry ("BandInfo") is associated to a band combination that UE can support for MR-DC or 5G carrier aggregation. Within each "BandInfo" multiple objects or list of entries can be present, where each object/entry is associated with a frequency range and a RAT (in the example "interFreqBandListFR1" is associated to FR1 frequency range of 5G and "interFreqBandListFR2" is associated to FR2 frequency range of 5G), note that the object/entry can be in form of a separate information element (IE) or can be part of a list. Each such object/entry further includes list of frequency bands that the UE can support (indicated by "InterFreqBandInfo" in the example is associated to a specific frequency band)) where each such entry at least contains a variable "interFreqNeedForGaps" indicating whether the UE requires a measurement gap for the frequency band or not. Absence of list of frequencies corresponding to a frequency range (e.g. "interFreqBandListFR2") indicates that the UE does not require measurement gap to measure any frequency belonging to the given frequency range.

The MN forwards the information about the UE's measurement gap capability to the SN using either SN addition request message or the SN reconfiguration complete message or SN modification required message or any other message passed from the MN to the SN.

The SN provides information about cell configuration/band combination used for the secondary cell group (SCG) which includes information on band combination used in SCG, frequency carrier identity where a given SCG cell is operating (e.g. ARFCN), cell index value used by the SN, global cell identity, physical cell identity, etc. This information can be passed from the SN using either the SN addition request acknowledge or the SN modification required or any other message which is transmitted from the SN to the MN. The SN provides the cell configuration/band combination to MN at least for the instances when the UE is reconfigured with a new cell configuration by SN. Based on cell configuration/band combination provided by the SN and frequencies configured for measurements to the UE, the MN can calculate the frequencies for which measurement gap is required.

The MN also provides information to the SN about the UE's measurement requirements in either the SN addition request message or the SN reconfiguration complete message or the SN modification required message or any other message passed from the MN to the SN. One or more of following information is provided by the MN to the SN:

c. List of frequency carriers which are configured by the MN to the UE for measurements and RAT type. The information can be provided in form of a single list or can be provided in form of multiple lists, where each list is associated to a specific frequency range (e.g. FR1 or FR2) and RAT type, and all the frequency carriers included are part of the given frequency range and RAT type. The MN may only indicate subset of frequency carriers configured by the MN to the UE, which belong to the frequency ranges for which the MN is required to configure measurement gap to the UE. For e.g. if the SN configures measurement gap(s) only for FR2 frequency ranges (i.e. when the UE supports multiple measurement gaps when operating in MR-DC), then MN includes all frequencies which are configured to be measured by the UE belonging to FR2 only;

d. Cell configuration/band combination of the master cell group which includes information on band combination used in MCG, frequency carrier identity where a given cell is operating, cell index value configured by the MN, global cell identity, physical cell identity, etc. the MN provides the cell configuration/band combination to SN at least for the instances when the UE is reconfigured with a new cell configuration by the MN. Based on cell configuration/band combination provided by the MN and frequencies configured for measurements to the UE, the SN can calculate the frequencies for which measurement gap is required;

e. SS burst set occasions (time offset and periodicity) and/or CSI-RS measurement configuration (e.g. CSI-RS transmission occasions, time offset and periodicity) for each frequency carrier configured by the MN to the UE for performing the measurements. The MN may only indicate the information for a subset of frequency carriers configured by the MN to the UE, which belong to the frequency ranges for which the SN is required to configure the measurement gap to the UE. For e.g. if the MN configures the measurement gap(s) only for the FR1 frequency ranges (i.e. when the UE supports multiple measurement gaps when operating in MR-DC), then the MN includes information for all frequencies which are configured to be measured by the UE belonging to the FR2 only; and f. Desired measurement gap pattern (measurement gap time offset, measurement gap periodicity, measurement gap length, measurement gap type and slot length used for measurement gap computation time e.g. duration of a slot/numerology used/subcarrier spacing used/number of slots in a system frame) for each frequency carrier or frequency range to be configured by the MN. The MN may only indicate the information for a subset of frequency carriers configured by the MN to the UE, which belong to the frequency ranges for which the MN is required to configure measurement gap to the UE. For e.g. if the MN configures measurement gap(s) only for the FR1 frequency ranges (i.e. when UE supports multiple measurement gaps when operating in MR-DC), then the MN includes information for all frequencies which are configured to be measured by the UE belonging to the FR2 only.

Figure 23:
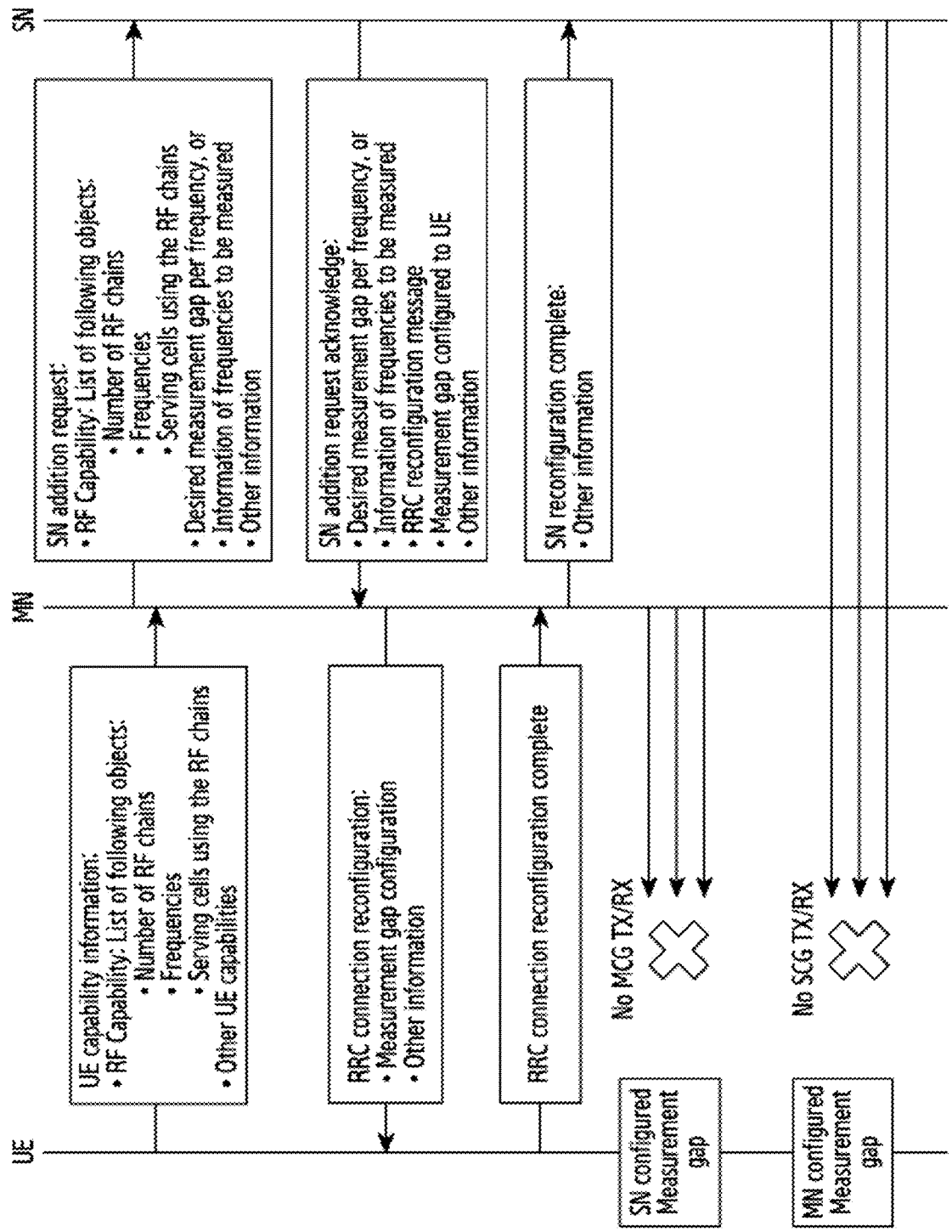
FIG. 23 illustrates a sequence diagram of a sub-solution-2 of the measurement gap configured by the SN according to embodiment as disclosed herein.

FIG. 23 illustrates a sequence diagram of a sub-solution-2 of measurement gap configured by the SN according to the embodiments as disclosed herein. The UE can be configured with multiple measurement gap(s) by the SN. The UE provides assistance information to the cellular network for measurement gap configuration. The UE uses the measurement gap(s) configured by the SN to perform measurement according to measurement configuration provided by both the MN and the SN.

In capability transfer message, the UE indicates the UE's capability of supporting measurement gap per cell group and/or measurement gap per serving cell and/or single measurement gap. The information is transmitted to the MN using capability transfer and the MN subsequently forwards the information to the SN using either the SN addition request message or SN reconfiguration complete message or the SN modification required message or any other message passed from the MN to the SN. If the UE is capable of supporting more than one measurement gap then for each measurement gap, the UE also provides information about the frequency range for which the measurement gap is applicable, i.e. group of cells is determined by the range of frequency over which the cells are operating. In one solution, this information can be provided by defining independent information elements (IE) for each frequency range and the UE includes the relevant IEs in the capability transfer message. In another solution, this information is provided by the UE by indicating the frequency range information associated with each measurement gap (e.g. can be in form of ARFCN range).

The MN and the SN configure independent measurements to the UE using RRC connection reconfiguration message. RRC connection reconfiguration message also includes the parameter(s) which indicates if the UE may include perCC-GapIndicationList or perCG-GapIndicationList within RRC connection reconfiguration complete message. Following information is provided for each frequency to be measured by the UE: configured frequencies, time offset for SS burst set occasions is relative to SFN=0 of PCell. For the SN configured frequencies, I one solution, time offset for SS burst set occasions is relative to SFN=0 of PSCell. In another solution is that time offset for SS burst set occasions for the SN configured frequencies is relative to SFN=0 of PCell.

Based on the configured measurements, the UE determines which the RF chains are used to perform measurements of which frequency carrier. Also, based on serving cells which are configured by the MN and the SN, the UE determines which the RF chains are used for communication with which serving cells. Using the above information, the UE determines the measurement gap required for each serving cell in order to measure the frequencies configured by MN and/or SN. The UE determines whether the UE is required to indicate the UE's measurement gap requirement to the SN if one or more of the following criteria are met:

a. If the UE receives the SN RRC connection reconfiguration message which contains a parameter "gapindication-ListRequired;"

b. If the UE determines that at least one of the frequency measurement requirement cannot be satisfied or cannot be measured by the current configured measurement gap to the UE by the SN. UE determines that gap is configured by the SN if the UE supports multiple measurement gaps and the UE is operating in Multi-RAT DC and at least one of the frequencies for which measurement gap requirement is not satisfied belongs to a frequency range for which the SN is responsible to configure measurement gap (e.g. FR2). Measurement requirement can be in terms of number of measurements the UE can perform for a frequency within a certain duration of time;

c. If the UE determines that at least one of the frequency measurement requirement cannot be satisfied or cannot be measured by any of the current configured measurement gap to the UE. Measurement requirement can be in terms of number of measurements the UE can perform for a frequency within a certain duration of time; and d. If the UE has received the RRC reconfiguration message from SN and due to which the UE determines that at least one of the frequency measurement requirement cannot be satisfied or cannot be measured by any of the current configured measurement gap to the UE. Measurement requirement can be in terms of number of measurements the UE can perform for a frequency within a certain duration of time.

If the UE receives the SN RRC connection reconfiguration message in response for which the UE determines based on (3) that the UE needs to indicate the UE's measurement gap requirement to network, then the UE performs transmission of the UE's measurement gap requirement (according to 6) to the SN using the "RRC connection reconfiguration complete" message or any other RRC message sent from the UE to the SN.

If the UE receives the MN RRC connection reconfiguration message in response for which the UE determines based on (3) that the UE needs to indicate the UE's measurement gap requirement to network, one or more of following procedure is used to indicate measurement gap requirement by the UE to the SN:

e. In one solution, if the MN RRC connection reconfiguration message encapsulates the SN RRC connection reconfiguration message, then the UE provides the UE's measurement gap requirement (according to 6) using "RRC connection reconfiguration complete" message sent to the SN;

f. In another solution:

i. If measurement gap indication timer is configured to the UE, then the UE (re)starts measurement gap indication timer;

ii. During the time measurement gap indication timer is running if the UE is required to transmit SN RRC connection reconfiguration complete, then the UE provides the UE'smeasurement gap requirement using "RRC connection reconfiguration complete" message sent to the SN; and iii. If measurement gap indication timer expires or if measurement gap indication timer is not configured to the UE, the UE provides the UE's measurement gap requirement using "RRC measurement gap indication" or dynamic capability indication message sent to the SN. Note that these RRC messages are the UE initiated and at least contains the UE's measurement gap requirements as provided in 6;

g. In another solution, the UE provides the UE's measurement gap requirement (according to 6) using the first "RRC connection reconfiguration complete" message which needs to be sent to the SN after reception of MN RRC connection reconfiguration message; and h. In another solution, the UE provides the UE's measurement gap requirement (according to 6) using "RRC connection reconfiguration complete" message sent to the MN:

i. In one solution, the measurement gap requirement content is encapsulated within a container which is encoded using RRC format used by the SN. The MN after receiving the container transparently (without any modifications) forwards container to the SN using the SN addition request or the SN modification or the SN reconfiguration complete or any other message which is transmitted from the MN to the SN; and ii. In another solution, the measurement gap requirement is encoded using RRC format used by the MN. the MN forwards the information to the SN using the SN addition request or the SN modification or SN reconfiguration complete or any other message which is transmitted from the MN to the SN. The information is forwarded by the MN using an RRC container and can be the same contents and RRC IE as used by the UE to indicate the UE's measurement gap requirement (according to 6).

If the UE provides information about the UE's measurement gap requirement, following information is included:

i. Measurement configuration provided by the MN and the SN: (i) Frequency carriers configured by the MN and the SN for measurements. (ii) SS burst set occasions and/or CSI-RS occasions for each frequency carrier configured by the MN and the SN for measurements. The UE may only include information about the MN measurement configuration if the MN measurement configuration includes the contents within an SN RRC message or SN RRC container;

j. Measurement gap requirement per configured cell:

i. Serving cell(s) index for which measurement gap to be applied and whether the serving cell belongs to MCG or SCG; and ii. The UE includes desired measurement gap pattern, which includes information on measurement gap time offset, measurement gap time periodicity, measurement gap length, measurement gap type and slot length used for measurement gap computation time e.g. duration of a slot/numerology used/subcarrier spacing used/number of slots in a system frame). Following information is included:

Desired measurement gap time offset. The measurement gap time offset can be a time variable value, in which case the UE provides information of time varying pattern of measurement gap offset. Note that desired measurement gap time offset value can implicitly indicate values of desired measurement gap time periodicity and/or measurement gap length and/or measurement gap type;

Desired measurement gap time periodicity;

Desired measurement gap length; and

Desired measurement gap type. One measurement gap type value can point to a measurement gap pattern which can be configured by cellular network. Different types of measurement gap patterns are pre-defined to the UE and the UE can indicate the desired measurement gap pattern using given information. Note that desired measurement gap type value can implicitly indicate values of desired measurement gap time periodicity and/or measurement gap length;

k. Measurement gap requirement per frequency carrier:

i. List of frequency carriers for which the measurement gap is required. Each entry in the list may include frequency carrier identifier (e.g. ARFCN); and ii. The UE includes desired measurement gap pattern, for each frequency carrier for which the measurement gap is required. This includes information on measurement gap time offset, the measurement gap time periodicity, measurement gap length, measurement gap type and slot length used for measurement gap computation time e.g. duration of a slot/numerology used/subcarrier spacing used/number of slots in a system frame). Following information is included:

Desired measurement gap time offset. The measurement gap time offset can be a time variable value, in which case the UE provides information of time varying pattern of measurement gap offset. Note that desired measurement gap time offset value can implicitly indicate values of desired measurement gap time periodicity and/or measurement gap length and/or measurement gap type;

Desired measurement gap time periodicity;

Desired measurement gap length;

Desired measurement gap type. One measurement gap type value can point to a measurement gap pattern which can be configured by cellular network. Different types of measurement gap patterns are pre-defined to the UE and the UE can indicate the desired measurement gap pattern using given information. Note that desired measurement gap type value can implicitly indicate values of desired measurement gap time periodicity and/or measurement gap length; and Desired measurement gap pattern.

iii. The UE includes desired measurement gap pattern, which includes information on measurement gap time offset, measurement gap time periodicity, measurement gap length, measurement gap type and slot length used for measurement gap computation time e.g. duration of a slot/numerology used/subcarrier spacing used/number of slots in a system frame). The UE can include multiple measurement gap patterns where each measurement gap may indicate the frequency range over which the measurement gap needs to be applied. Following information is included:

Desired measurement gap time offset. The measurement gap time offset can be a time variable value, in which case the UE provides information of time varying pattern of measurement gap offset. Note that desired measurement gap time offset value can implicitly indicate values of desired measurement gap time periodicity and/or measurement gap length and/or measurement gap type;

Desired measurement gap time periodicity;

Desired measurement gap length; and

Desired measurement gap type. One measurement gap type value can point to a measurement gap pattern which can be configured by cellular network. Different types of measurement gap patterns are pre-defined to the UE and the UE can indicate the desired measurement gap pattern using given information. Note that desired measurement gap type value can implicitly indicate values of desired measurement gap time periodicity and/or measurement gap length.

If the SN can configure multiple measurement gaps to the UE:

a. The SN provides measurement gap configuration to the UE. Each measurement gap also includes cell id information for which measurement gap needs to be applied (i.e. measurement gap is applied per cell group). Cell id information can be in form of cell index value and/or physical cell identity and/or frequency carrier identity and/or frequency range identifier. When information is provided in form of frequency range identifier, then the UE determines the cells for which the measurement gap needs to be applied by finding the cells which are operating in frequencies (e.g. frequency location of SS burst set or frequency location of CSI-RS) belonging to the given frequency range. For each measurement gap, the UE determines the frequencies which need to be measured by the RF chain associated with the cell for which measurement gap is provided;

b. Measurement gap configuration contains following information if measurement gap per cell group is included:

i. Release: Command to release measurement gap configuration provided by MN. When the UE is operating in Multi-RAT dual connectivity (MR-DC), then the UE does not releases any measurement gap configuration provided by SN if release command is received; and ii. setup: Contains following information:

measGapConfigToRemoveList: List of objects, where each object contains: Cell group identifier indicating for which cells the measurement gap needs to be applied. The cell group is defined per frequency range, e.g. if information is for frequency range FR2 then the UE only applies measurement gap to the cells which are operating in FR2; and measGapConfigToAddModList: List of objects, where each object contains: Measurement gap pattern to be applied and Cell group identifier indicating for which cells the measurement gap needs to be applied. The cell group is defined per frequency range, e.g. if information is for frequency range FR2 then the UE only applies measurement gap to the cells which are operating in FR2;

c. If measurement gap configuration is corresponding to measurements gaps per cell group and setup container is included:

i. Release any measurement gap configuration if configuration does not correspond to measurement gap per cell group;

ii. In one solution if measGapConfigToRemoveList is included: For each entry included in the measGapConfigToRemoveList, release measurement gap associated with cell group indicated in the entry;

iii. In another solution, if measGapConfigToRemoveList is not supported, the UE releases all measurement gap configuration provided by the MN; and iv. If measGapConfigToAddModList in included: For each entry included in the measGapConfigToAddModList, apply or (re)configure measurement gap for the cell group indicated in the entry. To compute measurement gap, the first slot of each gap occurs at an System Frame Number (SFN) and slot meeting the condition: (a) SFN mod T=FLOOR (gapOffset/NumSlots); (b) slot=gapOffset mod NumSlots, where T is the measurement gap repetition periodicity in terms of number of system frames, value of gapOffset is provided within measurement gap configuration, NumSlots is number of slots within one system frame. Here, slot and SFN are referenced with respect to the cell which has maximum value of slot duration among all the MCG and SCG cells which belong to the indicated cell group; and d. The SN forwards information to the MN about measurement gap configured to the UE during which the MN is required to stop any MCG transmissions and receptions for the UE and slot length (e.g. time duration of a slot/numerology used/subcarrier spacing used/number of slots in a system frame) used for computation of each measurement gap. The information can be included within SCG-Config RRC container which can be included within any message passed from the SN to the MN e.g. the SN reconfiguration or the SN modification request message or SN modification confirm. The MN determines the MCG serving cells associated with a measurement gap by identifying the cells which are operating within the frequency range indicated in the measurement gap. The MN stops any MCG transmissions of the serving cell associated with measurement gap indicated by the SN.

Figure 24:
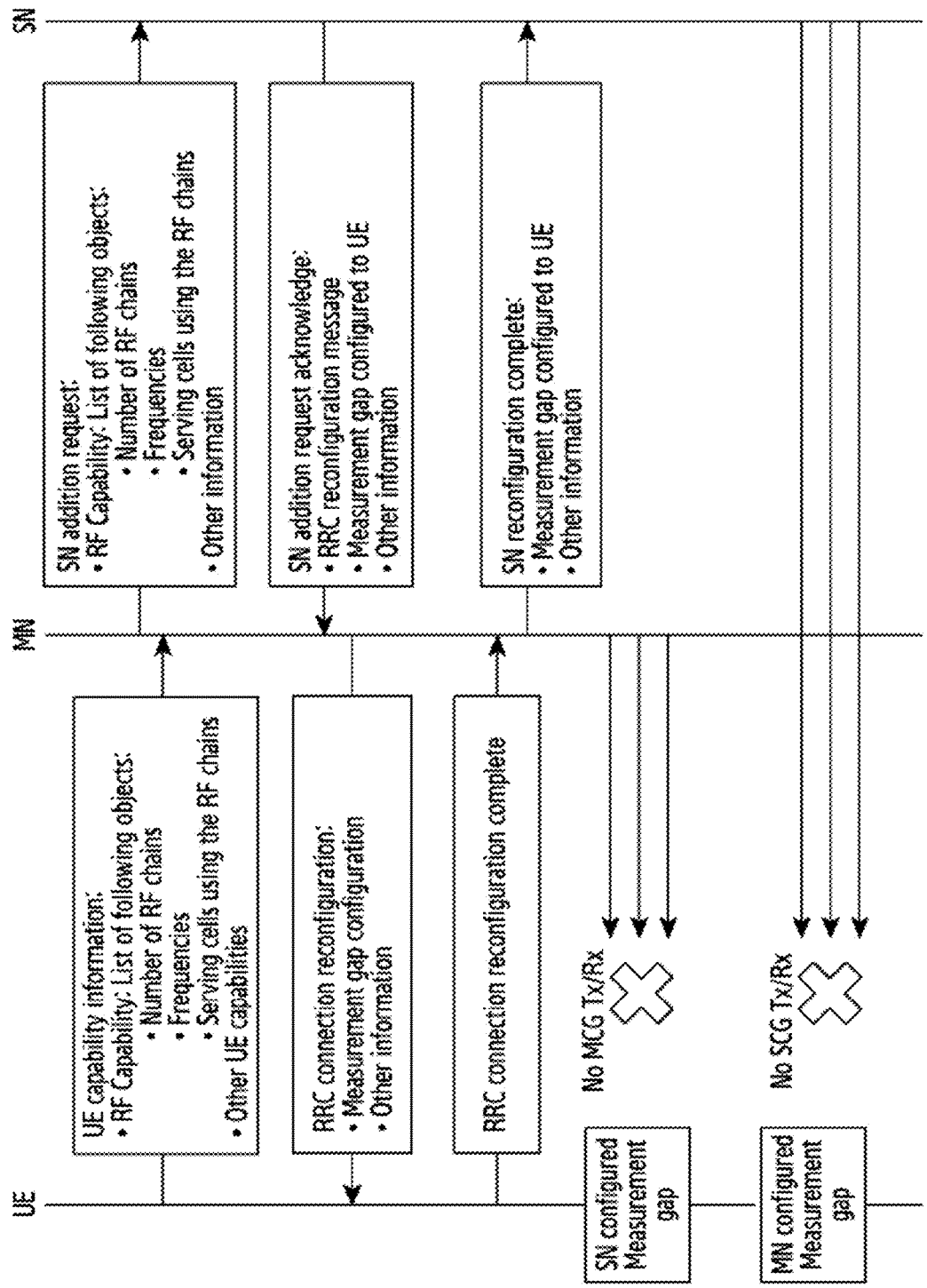
FIG. 24 illustrates a sequence diagram of a sub-solution-1 of the measurement of gap configured by the MN and the SN according to embodiment as disclosed herein.

FIG. 24 illustrates a sequence diagram of a sub-solution-1 of measurement of gap configured by the MN and the SN according to embodiment as disclosed herein. The UE can be configured with multiple measurement gap(s) by the MN and the SN.

The UE provides information to the MN about the RF chains used by the UE to perform measurements of different frequencies and the RF chains used by the UE which are in use by the master cell group (MCG) and the Secondary Cell Group (SCG). The information can be presented as a list of objects where each object contains information about the RF chain identifier(s) and/or frequencies which can be measured by the RF chain(s) and/or whether the RF chains are used by MCG or SCG for data transmission and/or cell identities which are used by the RF chain(s). This information can be part of the UE capability information message transmitted by the UE to the MN during capability transfer or RRC connection reconfiguration complete message transmitted by the UE to the MN or the RRC connection complete message transmitted by the UE to network.

The MN forwards the information about the UE's RF capability to the SN using either the SN addition request message or the SN reconfiguration complete message or the SN modification required message or any other message passed from the MN to the SN.

The MN also provides information to the SN about the MN's measurement requirements in either the SN addition request message or SN reconfiguration complete message or the SN modification required message or any other message passed from the MN to the SN. One or more of following information is provided by the MN to the SN:

a. List of frequency carriers which are configured by the MN to the UE for measurements. The MN may only indicate subset of frequency carriers configured by the MN to the UE which are required for measurement gap configuration to the UE;

b. Cell id used by the MN for each frequency carrier (if configured) which is configured by the MN to the UE for measurements. The MN may only indicate subset of values configured by the MN to the UE which are required for measurement gap configuration to the UE;

c. SS burst set occasions (time offset and periodicity) for each frequency carrier configured by the MN to the UE for measurements. The MN may only indicate the information for a subset of frequency carriers configured by the MN to the UE which are required for measurement gap configuration to the UE;

d. Desired measurement gap pattern (measurement gap time offset, measurement gap periodicity, measurement gap length and measurement gap type) for each frequency carrier to be configured by the SN. The MN may only indicate the information for a subset of frequency carriers configured by the MN to the UE which are required for measurement gap configuration to the UE; and e. Time occasions (time offset, time periodicity, and time duration) where transmission and/or reception may be stopped by the SN for each frequency to be measured by the UE. The MN may only indicate the information for a subset of frequency carriers configured by the MN to the UE which are required for measurement gap configuration to the UE.

The SN provides information to the MN about the SN's measurement requirements in the SN addition request acknowledge or the SN modification required or any other message which is transmitted from the SN to the MN. One or more of following information is provided by the SN to the MN:

a) List of frequency carriers which are configured by the SN to the UE for measurements. The SN may only indicate subset of frequency carriers configured by the SN to the UE which are required for measurement gap configuration to the UE;

b) Cell id used by the SN for each frequency carrier (if configured) which is configured by the SN to the UE for measurements. The SN may only indicate subset of values configured by the SN to the UE which are required for measurement gap configuration to the UE;

c) SS burst set occasions (time offset and periodicity) for each frequency carrier configured by the SN to the UE for measurements. The SN may only indicate the information for a subset of frequency carriers configured by the SN to the UE which are required for measurement gap configuration to the UE;

d) Desired measurement gap pattern (measurement gap time offset, measurement gap periodicity, measurement gap length, and measurement gap type) for each frequency carrier to be configured by the SN. The SN may only indicate the information for a subset of frequency carriers configured by SN to the UE which are required for measurement gap configuration to the UE; and e) Time occasions (time offset, time periodicity, and time duration) where transmission and/or reception may be stopped by the MN for each frequency to be measured by the UE. The SN may only indicate the information for a subset of frequency carriers configured by the SN to the UE which are required for measurement gap configuration to the UE.

The MN and the SN configures independent measurement gaps to the UE to measure the MN and the SN configured measurement frequencies:

a) The measurement gap(s) configured by the SN can be provided per each SCG serving cell or single measurement gap can be used for all SCG serving cells; and b) The measurement gap(s) configured by the MN can be provided per each MCG serving cell or single measurement gap can be used for all MCG serving cells.

Figure 25:
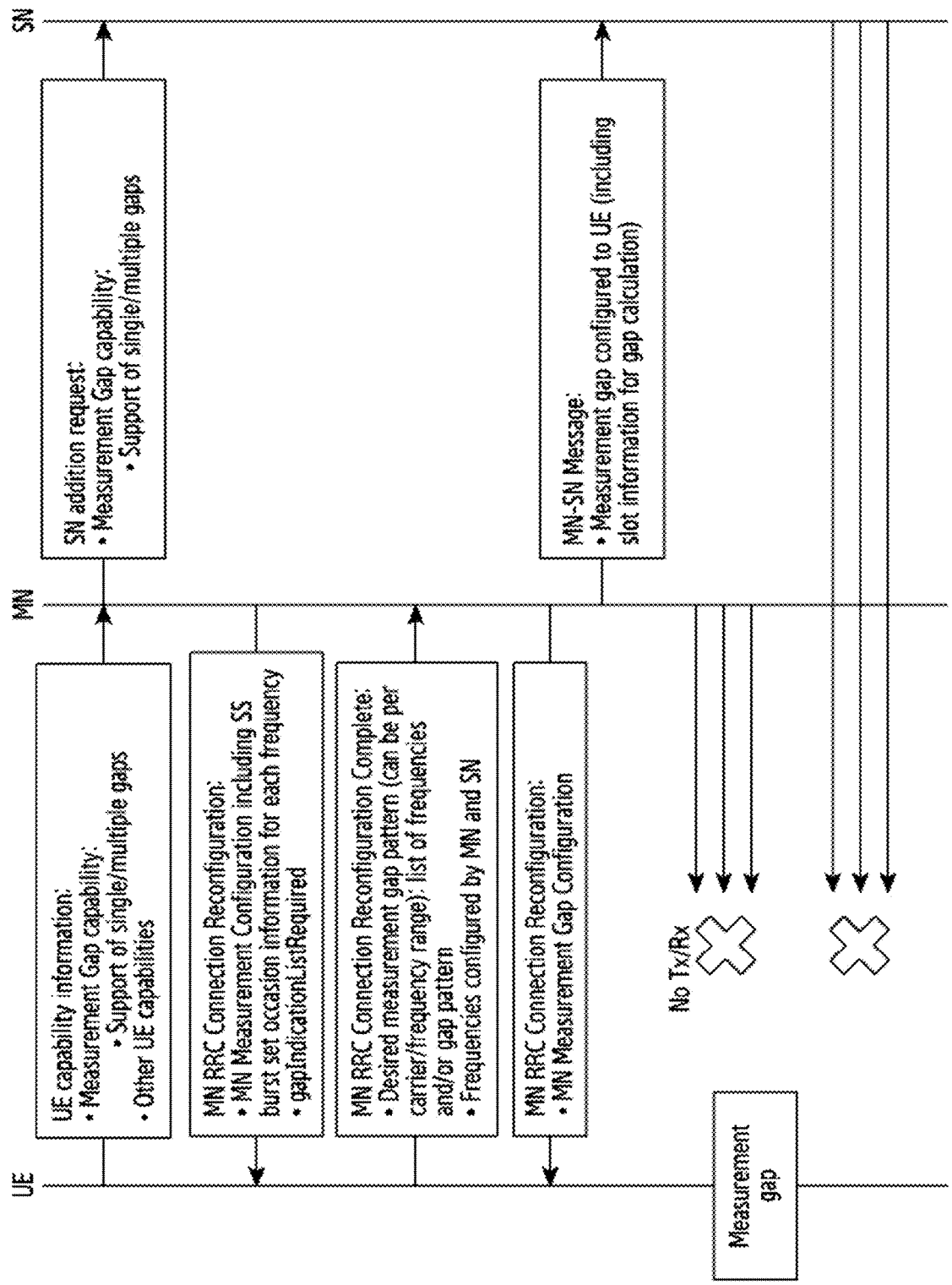
FIG. 25 illustrates a sequence diagram of a sub-solution-2 of the measurement gap configured by the MN and the SN according to embodiment as disclosed herein.

FIG. 25 illustrates a sequence diagram of a sub-solution-2 of the measurement gap configured by the MN and the SN according to embodiment as disclosed herein.

Figure 26:
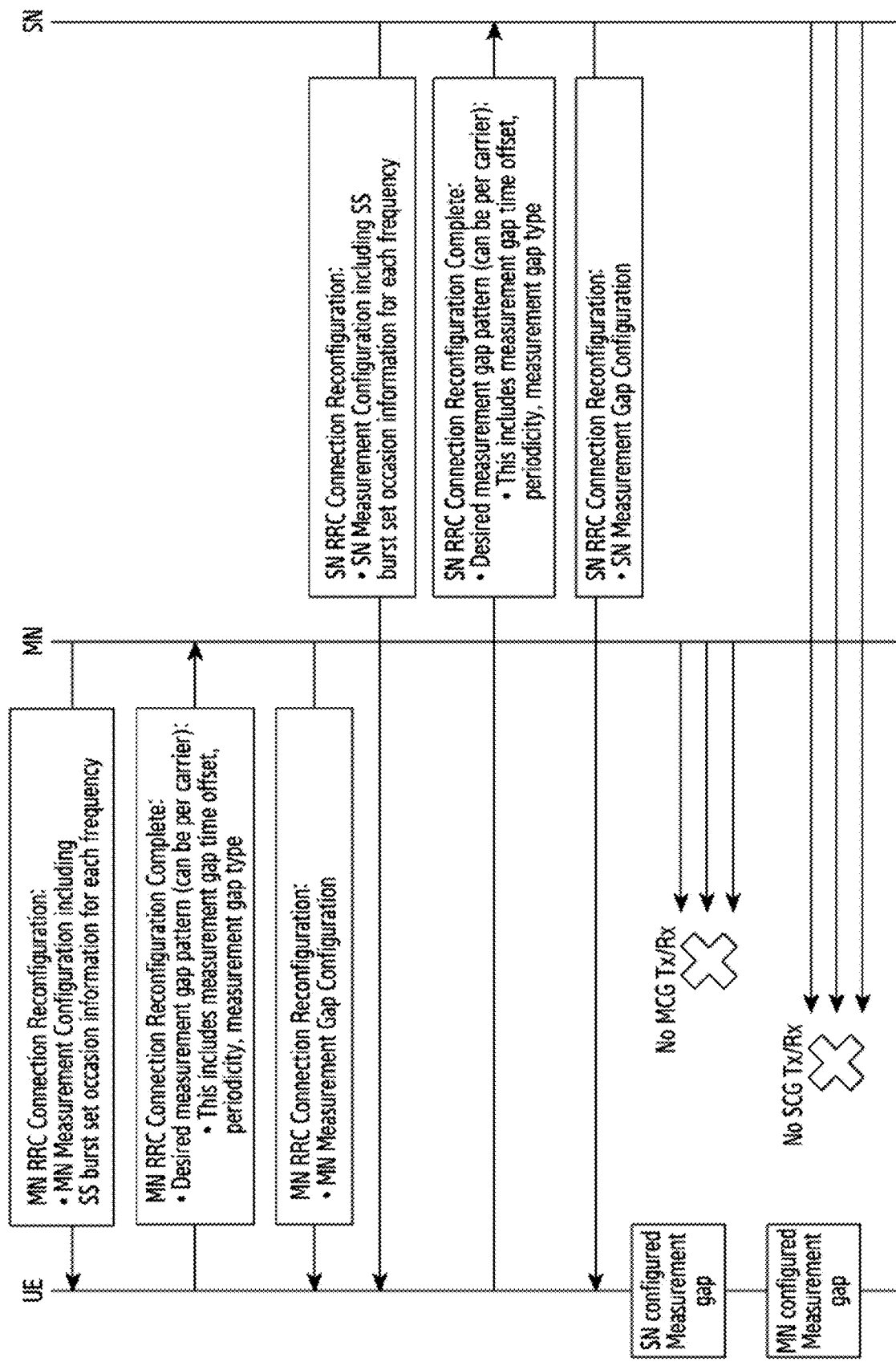
FIG. 26 illustrates a sequence diagram of a sub-solution-3 of the measurement gap configured by the MN and the SN according to embodiment as disclosed herein.

FIG. 26 illustrates a sequence diagram of a sub-solution-3 of the measurement gap configured by the MN and the SN according to embodiment as disclosed herein.

In another embodiment of the provided method, the UE can perform pre-processing of uplink data packets (i.e. processing of PDCP, RLC and MAC packets headers before reception of uplink grant) for a split bearer which is configured to the UE for uplink data transmission over different bandwidth parts. In order to minimize the number of retransmissions and packets losses due to pre-processing of packets in one of the links, the UE performs one or more of the following procedure.

PDCP PDUs are forwarded to RLC entities connected to the PDCP entity before reception of uplink grant. Ratio of amount of data which is forwarded between the RLC entities can be one or more of the following:

a. If number of buffered packets are less than a threshold ul-DataSplitThreshold (which is the same threshold used for link selection for uplink split bearer), then:

i. If ul-DataSplitDRB-ViaSCG (which is the same parameter used for link selection when buffered data is less than ul-DataSplitThreshold) is configured, then UE forwards the buffered packet to RLC entity corresponding to SCG; and ii. Else the UE forwards the packets to RLC entity corresponding to MCG;

b. If number of buffered packets are greater than a threshold ul-DataSplitThreshold (which is the same threshold used for link selection for uplink split bearer), then:

i. Ratio of forwarding of packets between the RLC entities is the same as ratio of data rates for the respective links of RLC entities;

ii. Cellular network configures the ratio value of pre-processing between the RLC entities and UE uses the same ratio for packet forwarding; and iii. Cellular network configures two parameters thresholdSCG and thresholdMCG, the ratio with which UE forwards the packets between MCG and SCG links is given by thresholdMCG/thresholdSCG.

Number of PDCP PDUs which are forwarded to each RLC entity is one or more of the following:

c. Network configures two thresholds, thresholdSCG and thresholdMCG (same as above). Maximum amount of data that UE can forward to SCG RLC entity for pre-processing is same as thresholdSCG. Maximum number of packets that UE can forward to MCG RLC entity for pre-processing is same as thresholdMCG. The thresholdMCG and the thresholdSCG can have units of number of bytes or can have unit of number of PDCP PDUs; and d. For each link, amount of data which can be pre-processed is defined as estimated link data rate*a time threshold value. Here, estimated link data rate can be determined by the UE by computing a running average of link data rate. The time threshold can be one or more of the following, where value of N is a pre-determined integer value:

i. N*HARQ RTT time;

ii. N*Transmission Time Interval; and iii. dsr-TransMax*sr-ProhibitTimer.

After expiry of a timer for a link, all the buffered RLC packets are forwarded to other RLC entity which is connected to the source PDCP entity. Multiple solutions can exist for timer trigger. In one solution, timer is (re)started when an uplink grant is received for the given link. In another solution, time is triggered when maximum pre-processing limit is reached for the given link. In another solution, timer is (re)started when first packet is pre-processed by the RLC entity of the given link. The length of the timer can be one or more of the following:

e. K*HARQ RTT time, where value of K is a pre-determined value;

f. K transmission time interval, where value of K is a pre-determined value;

g. dsr-TransMax*SR periodicity, where dsr-TransMax is the number of SR transmission attempts after random access procedure is initiated and SR periodicity is the time periodicity with which SR can be transmitted on the given link; and h. The time length can be configured by the cellular network.

In another solution, PDCP status report is transmitted by the receiving PDCP entity based on one or more of the following:

i. Expiry of PDCP reordering timer for the PDCP entity;

j. If number of missing PDCP PDUs becomes greater than a threshold for the PDCP entity. The threshold can be a pre-determined value or can be a function of reordering window length of the PDCP entity; and k. If number of consecutive missing PDCP PDUs becomes greater than a threshold for the PDCP entity. The threshold can be a pre-determined value or can be a function of reordering window length of the PDCP entity.

In another solution, no pre-processing is performed for split bearers if PDCP entity is configured for packet duplication.

In another solution, pre-processing can be done in split bearers which are configured for duplication such that when duplication is activated, RLC PDUs pending on MCG are queued behind already pending RLC PDUs in SCG and vice versa from SCG to MCG.

In another solution, pre-processing can be done in split bearers which are configured for duplication such that when duplication is activated by serving node, duplication is avoided for the PDCP PDUs which are already preprocessed and only the new PDCP PDU may be preprocessed (which arrive after duplication becomes activated) are forwarded to both MCG and SCG.

In another solution, if PDCP entity is configured with carrier aggregation based packet duplication (i.e. both RLC entities connected to PDCP are connected to same MAC entity), then the UE always performs pre-processing of packets where each packet is sent both the connected RLC entities if duplication is activated.

The embodiments disclosed herein can be implemented using at least one software program running on at least one hardware device and performing network management functions to control the elements.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof Although the present disclosure has been described with an exemplary embodiment, various changes and modifications may be suggested to one skilled in the art. It is intended that the present disclosure encompass such changes and modifications as fall within the scope of the appended claims.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A terminal in a wireless communication system comprising:
 a transceiver; and
 at least one processor configured to:
  receive, from a base station via radio resource control (RRC) signaling, a configured scheduling-radio network temporary identifier (CS-RNTI) and information on a first bandwidth part (BWP), wherein the first BWP is configured with a semi-persistent scheduling (SPS) configuration, the SPS configuration including a periodicity associated with the first BWP; and
  perform a first SPS communication on the first BWP based on the CS-RNTI and the SPS configuration;
  based on identifying at least one first event associated with a switching of an active BWP to a second BWP, suspend the first SPS communication on the first BWP and perform a communication on the second BWP; and
  based on identifying at least one second event associated with the switching of the active BWP to the first BWP, perform a second SPS communication on the first BWP according to the CS-RNTI and the SPS configuration,
  wherein the second BWP is activated and the first BWP is deactivated according to the at least one first event, and
  wherein the second BWP is deactivated and the first BWP is activated according to the at least one second event.

2. The terminal of claim 1, wherein the information on the first BWP comprises a downlink BWP parameter or an uplink BWP parameter.

3. The terminal of claim 2, wherein the downlink BWP parameter comprises a downlink SPS configuration per serving cell and per BWP, and wherein the uplink BWP parameter comprises an uplink SPS configuration per serving cell and per BWP.

4. The terminal of claim 1, wherein the SPS configuration further comprises a number of hybrid automatic repeat request (HARQ) processes for the first BWP.

5. The terminal of claim 1, wherein the at least one first event or the at least one second event comprises:
- a reception of a RRC message indicating a change of the active BWP;
- a reception of control information indicating a change of the active BWP; and
- an expiration of a timer associated to the active BWP.

6. The terminal of claim 1,
wherein the at least one processor is further configured to receive, from the base station, information on a third BWP,
wherein the CS-RNTI is configured to the first BWP and the third BWP, and
wherein the third BWP is configured with a SPS configuration including a periodicity associated with the third BWP.

7. The terminal of claim 1,
wherein the second SPS communication on the first BWP starts on a symbol, and
wherein the symbol is determined based on a time offset of the SPS configuration.

8. A base station in a wireless communication system comprising:
- a transceiver; and
- at least one processor configured to:
  - transmit, to a terminal via radio resource control (RRC) signaling, a configured scheduling- radio network temporary identifier (CS-RNTI) and information on a first bandwidth part (BWP), wherein the first BWP is configured with a semi persistent scheduling (SPS) configuration, the SPS configuration including a periodicity associated with the first BWP;
  - perform a first SPS communication on the first BWP based on the CS-RNTI and the SPS configuration;
  - based on identifying at least one first event associated with a switching of an active BWP to a second BWP, suspend the first SPS communication on the first BWP and perform a communication on the second BWP; and
  - based on identifying at least one second event associated with the switching of the active BWP to the first BWP, perform a second SPS communication on the first BWP according to the CS-RNTI and the SPS configuration,
  wherein the second BWP is activated, and the first BWP is deactivated according to the at least one first event, and
  wherein the second BWP is deactivated and the first BWP is activated according to the at least one second event.

9. The base station of claim 8,
wherein the information on the first BWP comprises a downlink BWP parameter or an uplink BWP parameter.

10. The base station of claim 9, wherein the downlink BWP parameter comprises a downlink SPS resource configuration per serving cell and per BWP, and
wherein the uplink BWP parameter comprises an uplink SPS resource configuration per serving cell and per BWP.

11. The base station of claim 8, wherein the SPS configuration further comprises a number of hybrid automatic repeat request (HARQ) processes for the first BWP.

12. The base station of claim 8,
wherein the at least one first event or the at least one second event comprises:
- a reception of a RRC message indicating a change of the active BWP;
- a reception of control information indicating a change of the active BWP; and
- an expiration of a timer associated to the active BWP.

13. The base station of claim 8,
wherein the at least one processor is further configured to transmit, to the terminal, information on a third BWP,
wherein the CS-RNTI is configured to the first BWP and a third BWP, and
wherein the third BWP is configured with a SPS configuration including a periodicity associated with the third BWP.

14. The base station of claim 8,
wherein the second SPS communication on a first BWP starts on a symbol, and
wherein the symbol is determined based on a time offset of the SPS configuration.

* * * * *